(12) United States Patent
Yilmaz et al.

(10) Patent No.: US 10,735,092 B2
(45) Date of Patent: Aug. 4, 2020

(54) SYSTEM ARCHITECTURE FOR POWER CONTROL IN AN OPTICAL TRANSMISSION LINE

(71) Applicant: Infinera Corp., Sunnyvale, CA (US)

(72) Inventors: Omer F. Yilmaz, Palo Alto, CA (US); Stephane St-Laurent, Roxboro (CA); Steve Sanders, Los Altos, CA (US); Matthew L. Mitchell, Monte Sereno, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 16/228,468

(22) Filed: Dec. 20, 2018

(65) Prior Publication Data

US 2019/0149230 A1 May 16, 2019

Related U.S. Application Data

(63) Continuation of application No. 15/887,771, filed on Feb. 2, 2018.

(60) Provisional application No. 62/453,519, filed on Feb. 2, 2017, provisional application No. 62/453,523, filed on Feb. 2, 2017, provisional application No. 62/453,525, filed on Feb. 2, 2017, provisional application No. 62/453,530, filed on Feb. 2, 2017, provisional application No. 62/453,531, filed on Feb. 2, 2017.

(51) Int. Cl.
*H04B 10/079* (2013.01)
*H04J 14/02* (2006.01)
*H04B 10/038* (2013.01)
*H04L 12/24* (2006.01)

(52) U.S. Cl.
CPC ....... *H04B 10/0791* (2013.01); *H04B 10/038* (2013.01); *H04J 14/0221* (2013.01); *H04J 14/0291* (2013.01); *H04L 41/0677* (2013.01)

(58) Field of Classification Search
CPC .................................................. H04J 14/0221
See application file for complete search history.

(56) References Cited

U.S. PATENT DOCUMENTS

| 2004/0086274 | A1* | 5/2004 | Wan | H04B 10/2935 |
| | | | | 398/9 |
| 2007/0058984 | A1* | 3/2007 | Charlet | H04B 10/2935 |
| | | | | 398/160 |

(Continued)

*Primary Examiner* — Casey L Kretzer
(74) *Attorney, Agent, or Firm* — David L. Soltz

(57) ABSTRACT

An optical network is described that has a first ROADM node, a second ROADM node, and an optical transmission line establishing optical communication between the first ROADM node and the second ROADM node. The optical transmission line including an in-line amplifier node having a total input power and a total output power. The in-line amplifier node has a first monitoring tool configured to measure input optical power of the in-line amplifier node, and a second monitoring tool configured to measure output optical power of the in-line amplifier node. A software defined L0 network controller has circuitry configured to receive the optical power measured by the first and second monitoring tools from the in-line amplifier node, and to configure at least one of a gain and a gain tilt of the in-line amplifier node.

16 Claims, 19 Drawing Sheets

(56) References Cited

U.S. PATENT DOCUMENTS

2010/0158532 A1\* 6/2010 Goto ................ H05B 10/07955
398/81
2016/0285545 A1\* 9/2016 Schmidtke ........... H04B 10/038

\* cited by examiner

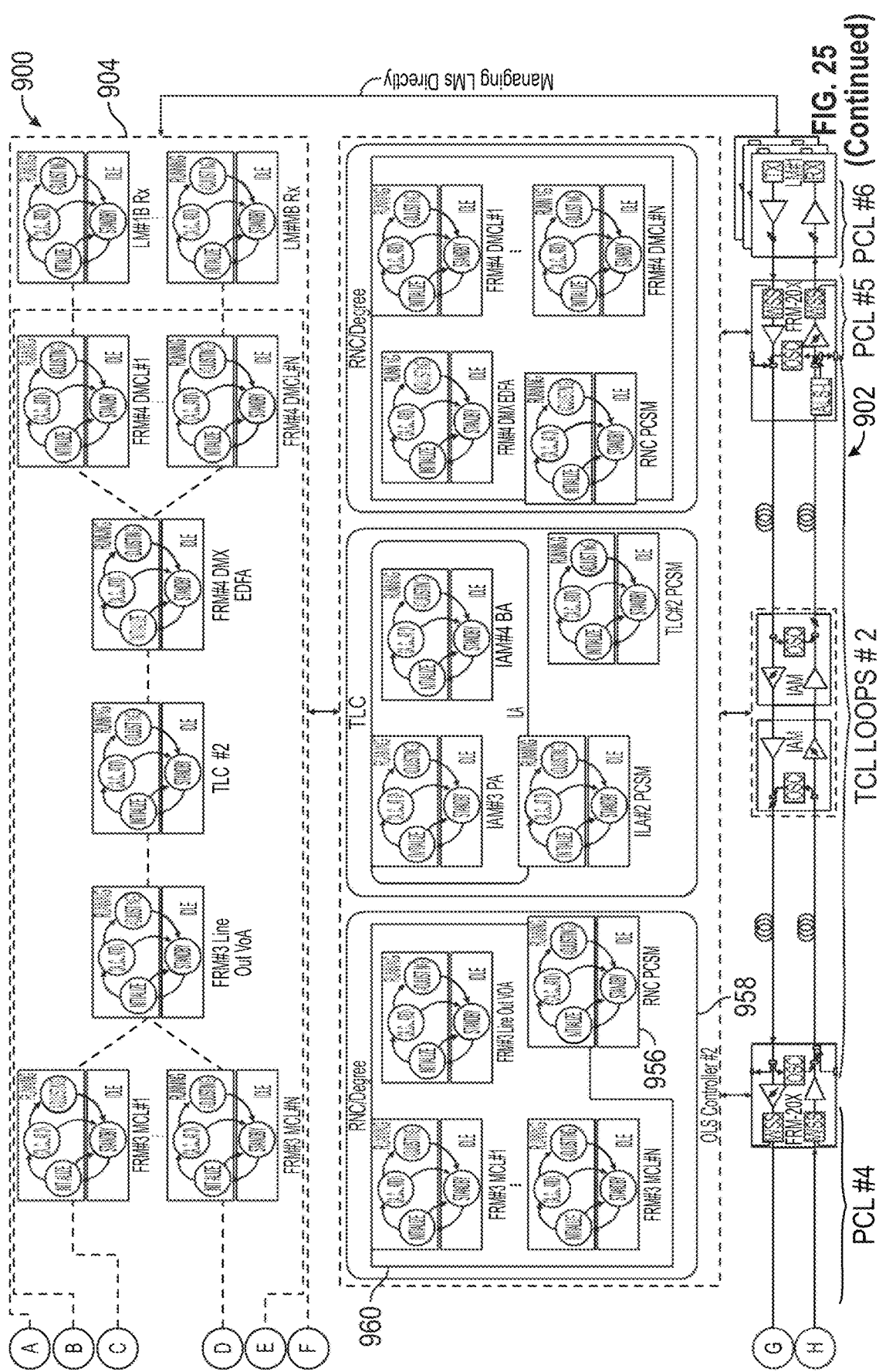

SYSTEM ARCHITECTURE FOR POWER CONTROL IN AN OPTICAL TRANSMISSION LINE

CROSS-REFERENCE TO RELATED APPLICATIONS

The present patent application is a continuation patent application of U.S. patent application Ser. No. 15/887,771, titled "Optical Restoration Methods in Optical Networks Controlled by a L0 SDN Controller", filed on Feb. 2, 2018, which claims priority to the provisional patent applications identified by, U.S. Ser. No. 62/453,519 titled "Layer-0 Optical Power Controls by a Centralized SDN Controller" filed on Feb. 2, 2017, U.S. Ser. No. 62/453,523 titled "External Network-to-Network Interface and Optical Express Power Controls" filed on Feb. 2, 2017, U.S. Ser. No. 62/453,525 titled "Optical Restoration Methods in Optical Networks Controlled by a L0 SDN Controller" filed on Feb. 2, 2017, U.S. Ser. No. 62/453,530 titled "System Architecture for Power Control in an Optical Transmission Line" filed on Feb. 2, 2017, and U.S. Ser. No. 62/453,531 titled "Method of Control for the Maintenance of the Optical Power in a ROADM Network" filed on Feb. 2, 2017, the entire contents of which are hereby incorporated herein by reference.

FIELD OF THE DISCLOSURE

The disclosure generally relates to methods and apparatuses for recovery in coherent optical transport networks (OTN) using a controller that controls all nodes in a restore path, in a parallel fashion, for faster restoration of the restore path.

BACKGROUND

An Optical Transport Network (OTN) is comprised of a plurality of switch nodes linked together to form a network. The OTN includes a data layer, a digital layer, and an optical layer. The optical layer contains multiple sub-layers. OTN structure, architecture, and modeling are further described in the International Telecommunication Union recommendations, including ITU-T G.709, ITU-T G.872, and ITU-T G.805, which are well known in the art. In general, the OTN is a combination of the benefits of SONET/SDH technology and dense wavelength-division multiplexing (DWDM) technology (optics).

The construction and operation of switch nodes (also referred to as "nodes") in the OTN is well known in the art. In general, the nodes of an OTN are generally provided with a control module, input interface(s) and output interface(s). The control modules of the nodes in the OTN function together to aid in the control and management of the OTN. The control modules can run a variety of protocols for conducting the control and management (i.e. Operation, Administration and Maintenance—referred to as OAM) of the OTN. One prominent protocol is referred to in the art as Generalized Multiprotocol Label Switching (GMPLS).

Generalized Multiprotocol Label Switching (GMPLS) is a type of protocol which extends multiprotocol label switching (MLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel.

Wave-division multiplexing is a type of multiplexing in which two or more optical carrier signals are multiplexed onto a single optical fiber by using different wavelengths (that is, colors) of laser light.

Generalized Multiprotocol Label Switching (GMPLS) includes multiple types of label switched paths including protection and recovery mechanisms which specify (1) working connections within a network having multiple nodes and communication links for transmitting data between a headend node and a tail end node; and (2) protecting connections specifying a different group of nodes and/or communication links for transmitting data between the headend node to the tail end node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tail end node or end node or destination node. The headend node or tail end node initially selects to receive data over the working connection (such as an optical channel data unit label switched path) and, if a working connection fails, the headend node or tail end node may select a protecting connection for passing data within the network. The set up and activation of the protecting connections may be referred to as restoration or protection.

Lightpaths are optical connections carried over a wavelength, end to end, from a source node to a destination node in an optical transport network (OTN). Typically, the lightpaths pass through intermediate links and intermediate nodes in the OTN. At the intermediate nodes, the lightpaths may be routed and switched from one intermediate link to another intermediate link. In some cases, lightpaths may be converted from one wavelength to another wavelength at the intermediate nodes.

As previously mentioned, optical transport networks (OTN) have multiple layers including a data packet layer, a digital layer, and an optical layer (also referred to as a photonic layer). The data and digital layers include an optical channel transport unit (OTU) sub-layer and an optical channel data unit (ODU) sub-layer. The optical layer has multiple sub-layers, including the Optical Channel (OCh) layer, the Optical Multiplex Section (OMS) layer, and the Optical Transmission Section (OTS) layer. The optical layer provides optical connections, also referred to as optical channels or lightpaths, to other layers, such as the electronic layer. The optical layer performs multiple functions, such as monitoring network performance, multiplexing wavelengths, and switching and routing wavelengths. The Optical Channel (OCh) layer manages end-to-end routing of the lightpaths through the optical transport network (OTN). The Optical Multiplex Section (OMS) layer network provides the transport of optical channels through an optical multiplex section trail between access points. The Optical Transmission Section (OTS) layer network provides for the transport of an optical multiplex section through an optical transmission section trail between access points. The OCh layer, the OMS layer, and the OTS layer have overhead which may be used for management purposes. The overhead may be transported in an Optical Supervisory Channel (OSC).

The Optical Supervisory Channel (OSC) is an additional wavelength that is adapted to carry information about the network and may be used for management functions. The OSC is carried on a different wavelength than wavelengths carrying actual data traffic and is an out-of-band channel. Typically, the OSC is used hop-by-hop and is terminated and restarted at every node.

The International Telecommunications Union (ITU) recommendation ITU-T G.709 further defines the OTS, OMS and OCh layers and recommends use of the OSC to carry overhead corresponding to the layers. Additionally, ITU-T recommendation G.872 specifies defects for the OTS, OMS, and OCh layers as well as specifying Operation, Administration & Maintenance (OAM) requirements.

ITU-T recommendations suggest that the OSC utilize a Synchronous Transport Signal (STS) Optical Carrier transmission rate OC-3. Optical Carrier transmission rates are a standardized set of specifications of transmission bandwidth for digital signals that can be carried on fiber optic networks. The OC-3 frame contains three column-interleaved STS Level 1 (STS-1) frames; therefore, the line overhead consists of an array of six rows by nine columns (that is, bytes). The OC-3 frame format is further defined in Telecordia's Generic Requirements GR-253, "Synchronous Optical Network Common Generic Criteria," Issue 4. The OC-3 frame format contains a transport overhead portion. Within the transport overhead portion, bytes designated as D4, D5, D6, D7, D8, D9, D10, D11, and D12 are defined by GR-253 for use by Data Communication Channel (DCC).

The patent application identified by U.S. Ser. No. 13/452, 413, titled "OPTICAL LAYER STATUS EXCHANGE OVER OSC—OAM METHOD FOR ROADM NETWORKS" filed on Apr. 20, 2012, discloses methods for supporting OAM functions for the optical layers, for example, for carrying defect information and overhead in the OSC. The application discloses methodology and apparatuses for supporting OAM functions such as continuity, connectivity, and signal quality supervision for optical layers. The methodology discloses mapping optical layer overhead OAM information to specific overhead bits and assigning the overhead bits to specific OSC overhead bytes. This provides reliable exchange of overhead bytes over OSC between nodes.

However, current systems and publications do not disclose mechanisms for optical layer recovery (e.g. protection and/or restoration). Current protocols define mechanisms for supporting protection in digital layers (SDH, OTN Networks) such as GR-253 and G.873.1; however, optical nodes may not have access to the digital layer. Further, there are no protocols for supporting protection functions in optical layers (OMS & OCh layers).

In the past, restoration systems would detect and localize a failure, calculate a restore path (or select from a pre-calculated list of restore paths based upon preference), signal for the restore path to determine whether the restore path was available, and then activate the restore path and manage optical power end to end. The activation of the restore path used a serial process in which nodes along the restore path were signaled in a serial manner due to distributed power controls. This requires the head-end node to receive information and updates of information from the nodes in the network, including each of the nodes in the restore path during the restoration process. Obtaining the information from the nodes in the network, and signaling and activating the nodes in a serial manner was a time-consuming process.

The present disclosure addresses these deficiencies utilizing a controller that controls all nodes in a restore path, in a parallel fashion, for faster restoration of the restore path.

SUMMARY

Method and optical nodes are disclosed. The problems caused by the time-consuming process of serial activation of optical nodes in a restore path are addressed by utilizing a controller that controls all optical nodes in a restore path, in a parallel fashion, for faster restoration of the restore path.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
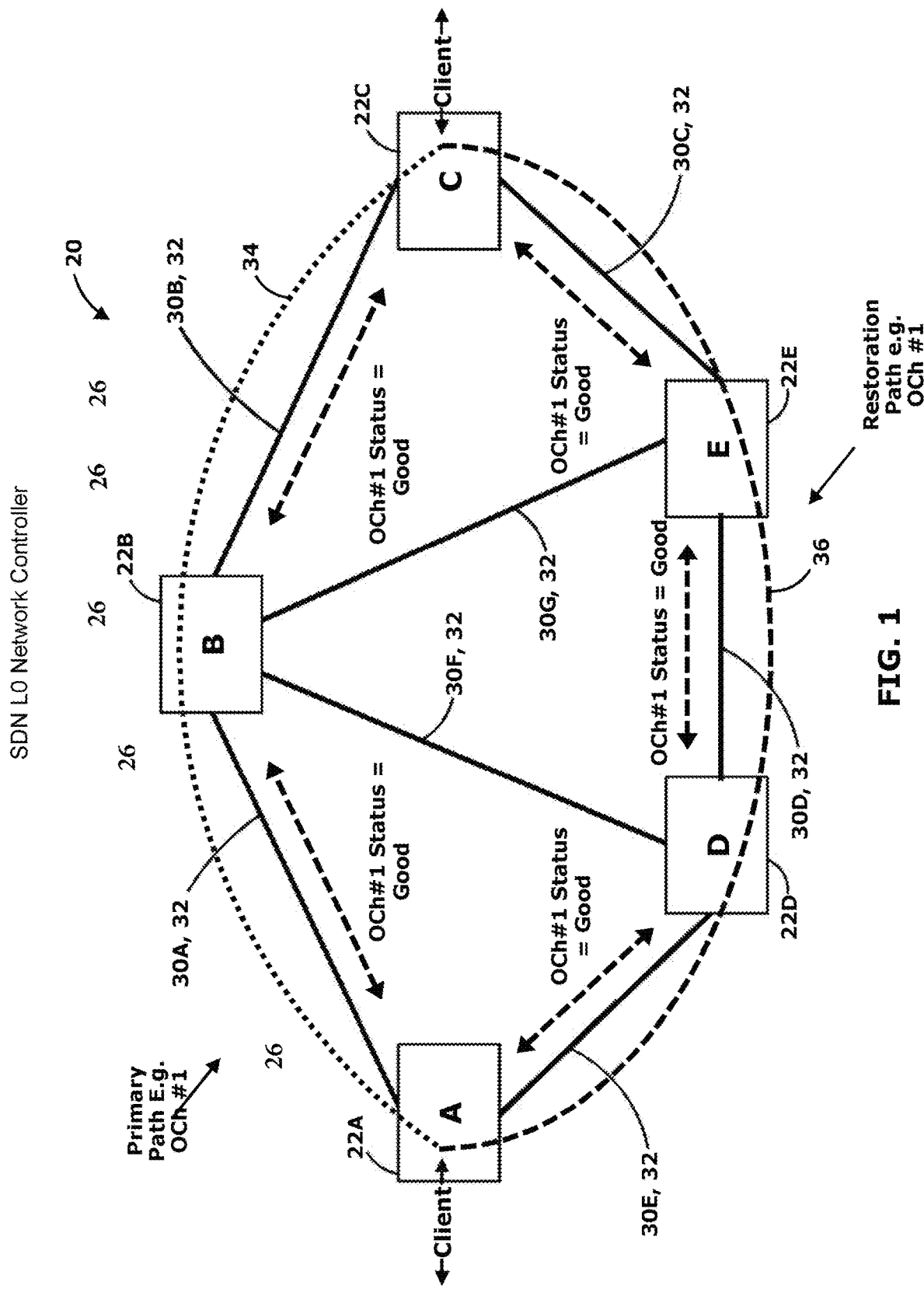
FIG. 1 is an illustration of an exemplary optical transport network in accordance with the present disclosure.

The following detailed description refers to the accompanying drawings. The same reference numbers in different drawings may identify the same or similar elements.

The mechanisms proposed in this disclosure overcome the problems caused by the time consuming nature for optical layer recovery. The present disclosure describes methods and apparatuses in which a SDN L0 network controller receives near real-time network performance information from each of the optical nodes in a restore path, and then implements recovery mechanisms in a parallel manner to reduce the time involved in activating a restore path.

DEFINITIONS

If used throughout the description and the drawings, the following short terms have the following meanings unless otherwise stated:

DWDM stands for dense wavelength division multiplexing. DWDM multiplexes multiple optical carrier signals, such as Optical Channel (OCh) signals or Super Channel (SCh) signals, onto a single optical fiber by using different laser light wavelengths (colors).

FPGA stands for field programmable gate array. FPGAs can be programed after deployment in a system.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

LOS Stands for Loss of Signal.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tail end node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance. Examples of OAM functions include continuity, connectivity and signal quality supervision.

OADM stands for optical add/drop multiplexer. ROADM stands for reconfigurable optical add/drop multiplexer. Network operators can remotely reconfigure the multiplexer by sending soft commands with a ROADM.

OC stands for optical carrier. Optical carrier transmission rates are a standardized set of specifications of transmission bandwidths for digital signals that can be carried on fiber optic networks.

OCh stands for Optical Channel layer.

OLT stands for Optical Line Terminal.

OMS stands for Optical Multiplex Section layer.

OSC stands for Optical Supervisory Channel.

OTN stands for Optical Transport Network which includes a set of optical switch nodes which are connected by optical fiber links. ITU-T recommendations G.709 and G.872 define OTN interface requirements and network architecture respectively.

OTS stands for Optical Transmission Section layer.

SCh stands for Super Channel. A Super-Channel (SCh) is a collection of one or more frequency slots to be treated as a unified entity for management and control plane purposes. A Frequency Slot is a range of frequency allocated to a given channel and unavailable to other channels within the same flexible grid. A frequency slot is a contiguous portion of the spectrum available for an optical passband filter. A frequency slot is defined by its nominal central frequency and its slot width. A frequency slot is further defined in the International Telecommunications Union Recommendation ITU-T G.694.1, "Spectral grids for WDM applications: DWDM frequency grid". A contiguous spectrum Super-Channel is a Super-Channel with a single frequency slot. A split-spectrum Super-Channel is a Super-Channel with multiple frequency slots.

SDN stands for Software defined networking. SDN, as used herein, includes software, which may be executed by hardware that is separate from switch nodes within the optical transport network, and which includes the functionality to compute and provision paths through the optical transport network for multiple switch nodes as well as instruct one or more switch nodes to compute paths through the optical transport network.

SF stands for Signal Failure.

SONET/SDH stands for Synchronous Optical Networking/Synchronous Digital Hierarchy which are standardized multiplexer protocols that transfer multiple digital bit streams over optical fiber using lasers or light emitting diodes.

DESCRIPTION

As used herein, the terms "comprises," "comprising," "includes," "including," "has," "having" or any other variation thereof, are intended to cover a nonexclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The use of the term "at least one" or "one or more" will be understood to include one as well as any quantity more than one, including but not limited to, 1, 2, 3, 4, 5, 10, 15, 20, 30, 40, 50, 100, etc. The term "at least one" or "one or more" may extend up to 100 or 1000 or more depending on the term to which it is attached. In addition, the quantities of 100/1000 are not to be considered limiting, as lower or higher limits may also produce satisfactory results.

In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example.

In accordance with the present disclosure, messages transmitted between nodes can be processed by circuitry within the input interface(s), and/or the output interface(s) and/or the node controller. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations. Additionally, it should be understood that the node can be implemented in a variety of manners as is well known in the art.

An exemplary optical transport network (OTN) 20 is shown in FIG. 1, by way of example. The optical transport network 20 includes optical switch nodes 22A-22n (hereinafter referred to as "nodes" or "optical nodes" or "photonic nodes") and a SDN L0 network controller 24 communicating with the nodes 22A-22n in parallel via a network 26. The SDN L0 Network Controller 24 collects network topology information internal to at least some of the nodes 22A-22n, as well as optical layer network performance information from the nodes 22A-22n. Exemplary optical layer network performance information includes optical amplifier gains, amplifier tilt, amplifier noise figure, span loss, component attenuations and attenuation set points for variable optical attenuators, + optical power levels at all interfaces, optical switch configurations (of e.g. WSS or multi-cast switch), alarms. The SDN L0 network controller 24 utilizes the network topology information to compute L0 paths, set up the L0 paths, and activate/deactivate the L0 paths. To obtain network configuration information and network performance information, set up the paths, and/or activate/deactivate the paths the SDN L0 network controller 24 may communicate messages directly with the nodes 22A-22n via the network 26 in a parallel manner.

The optical transport network 20 may conform to the requirements of the OSI model view of networks having seven layers, i.e., layer 1—physical layer; layer 2—data link layer; layer 3—network layer; layer 4—transport layer; layer 5—session layer; layer 6—presentation layer; and layer 7—application layer. In addition, the optical transport network 20 has an optical layer (denoted herein by "L0") that is a server layer that provides services to other layers, including lightpaths to a variety of client layers. In other words, the other layers within the OSI model make use of the lightpaths provided by the optical layer. To a SONET, Ethernet or IP network operating over the optical layer, the lightpaths are simply replacements for hardwired fiber connections between SONET terminals or IP routers. A lightpath is a connection between two nodes in the network, and is set up by assigning a dedicated wavelength on each link in the lightpath. The optical layer multiplexes multiple lightpaths into a single fiber and allows individual lightpaths to be extracted efficiently from the composite multiplex signal at network nodes 22A-22E, for example. This lightpath can be set up or taken down in response to a request from a higher layer. The optical transport network 20 may include any number of optical nodes 22A-22n. For exemplary purposes, the optical transport network 20 of FIG. 1 includes five optical nodes 22A-22E. The optical transport network 20 may be configured in any topology, for example, linear, ring, or mesh.

A headend node and a tail end node may be denoted for a particular path in accordance to the path setup direction. In this example, optical node 22A functions as a headend node (also known as a source node); while optical node 22C functions as a tail end node (also known as a destination node). Other optical nodes 22 between the headend node 22A and tail end node 22C in a particular path are known as intermediate nodes. In this example, the optical nodes 22B, 22D, and 22E act as intermediate nodes. In between the optical nodes 22A-22n are communication links 30A-30m. For purposes of simplicity of explanation, communication links 30A-30G are illustrated in FIG. 1, but it will be understood that there may be more or fewer communication links 30.

The optical nodes 22A-22n are adapted to facilitate the communication of data traffic (which may be referred to herein as "traffic" and/or "data") between optical nodes 22A-22n in the optical transport network 20 over communication links 30A-30m, as well as into and out of the optical transport network 20.

The communication links 30 can be implemented in a variety of ways, such as an optical fiber or other waveguide carrying capabilities. The communication links 30 can be fiber optic cables.

Data traffic and control information may follow one or more paths through the optical transport network 20. A primary path 34 (for example, OCh #1) may be established by one or more optical nodes 22A-22n, or by the SDN L0 network controller 24 separate from the optical nodes 22A-22n and/or separate from the optical transport network 20. In the example shown in FIG. 1, the primary path 34 is established between headend node 22A and tail end node 22C through intermediate node 22B. The primary path 34 initially carries data traffic and control information, and continues to carry data traffic and control information while there is no failure on the primary path 34.

A restoration path 36 (for example, OCh #1) may also be established to carry data traffic and control information. The headend node 22A and the tail end node 22C may select data traffic from the restoration path 36 if there is a failure on the primary path 34. In FIG. 1, the restoration path 36 is illustrated between headend node 22A and tail end node 22C through intermediate nodes 22D and 22E.

The primary path 34 and the restoration path 36 can be established by one or more nodes 22A-22n, such as headend node 22A, prior to any failure in the optical transport network 20, as illustrated in FIG. 1. Additionally, or alternately, one or more restoration path 36 may be established after a failure in the optical transport network 20 (see FIGS. 5 and 7). The primary path 34 and the restoration path 36 may be established, for example, by using GMPLS protocols. The primary path 34 and the restoration path 36 may be bi-directional or co-routed.

In general, the term "dedicated protection," as used herein, refers to a situation in which the headend node 22A or tail end node 22C sets up a dedicated restoration path 36 for a particular primary path 34, as illustrated in FIG. 1, in case of failure of the primary path 34, before failure of the primary path 34. In dedicated protection, the data traffic is simultaneously transmitted from the headend node 22A (and/or tail end node 22C) on both the primary path 34 and restoration path 36. Dedicated protection may be used with unidirectional and bidirectional protection, as described in RFC 4872, "RSVP-TE Extensions for E2E GMPLS Recovery" (May 2007).

Referring to FIGS. 2A, 2B, 2C, and 3, shown therein are block diagrams of aspects of an exemplary optical node 22A constructed in accordance with the present disclosure. In general, the optical nodes 22A-22n transmit and receive data traffic and control signals.

The optical nodes 22A-22n can be implemented in a variety of ways. Nonexclusive examples include optical line terminals (OLTs), optical cross connects (OXCs), optical line amplifiers, optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

Figure 2A:
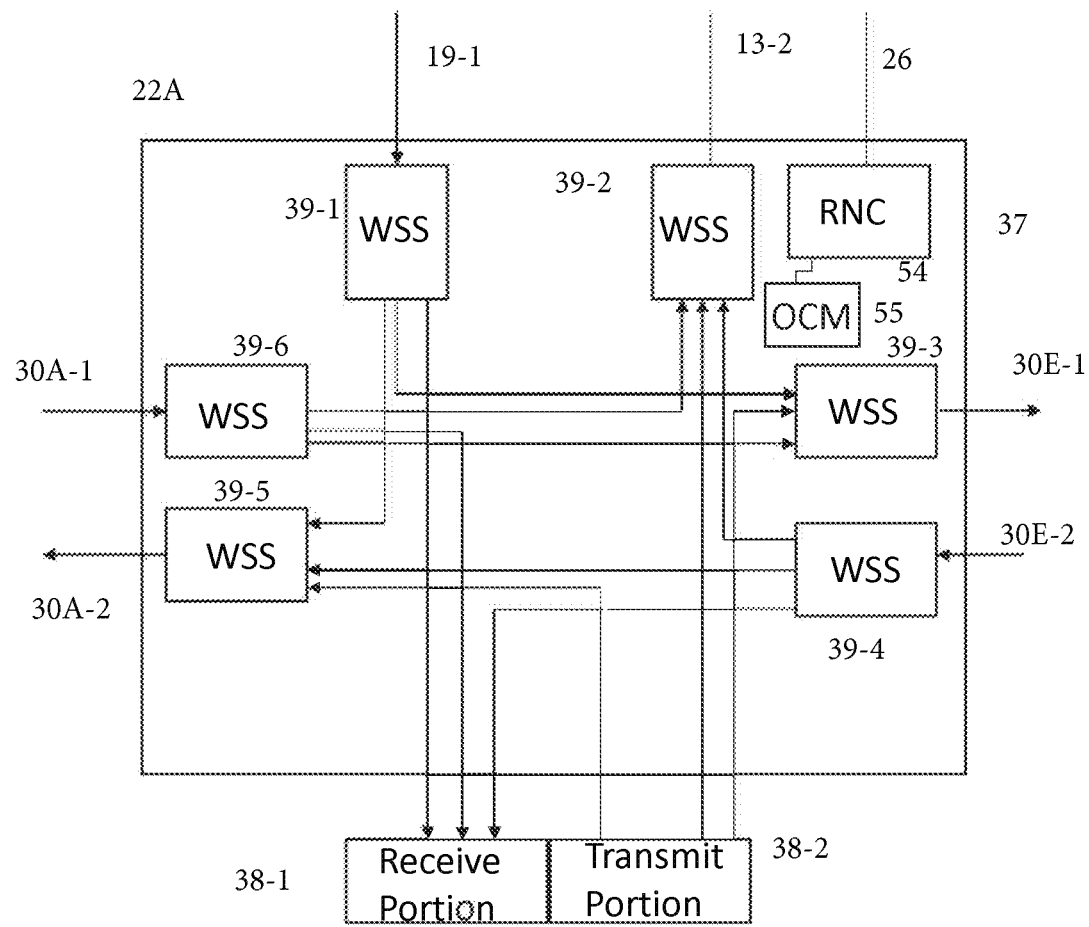
FIG. 2A is a block diagram of an aspect of an exemplary optical node in accordance with the present disclosure.

FIG. 2A illustrates an example of the optical node 22A being a ROADM site 37 that interconnects optical fiber links 30A, and 30E, and 13. Fiber links 30A, 30E and 13 may include optical fiber pairs, wherein each fiber of the pair carries optical signal groups propagating in opposite directions. As seen in FIG. 2A, for example, optical fiber link 30A includes a first optical fiber 30A-1, which carries optical signals toward optical node 22A, and a second optical fiber 30A-2 that carries optical signals output from optical node 22A. Similarly, optical fiber link 13 may include optical fibers 13-1 and 13-2 carrying optical signal groups to and from the optical node 22A, respectively. Further, optical fiber link 30E may include first (30E-1) and second (30E-2) optical fibers also carrying optical signals from and to optical node 22A, respectively. Additional nodes, not shown in FIG. 2A, may be provided that supply optical signal groups to and receive optical signal groups from optical node 22A. Such nodes may also have a ROADM having the same or similar structure as that of optical node 22A.

As further shown in FIG. 2A, receive portion 38-1 and transmit portion 38-2 may be provided adjacent the ROADM site 37 to add and drop optical signal groups, respectively.

The optical node 22A including transmit (38-2) and receive (38-1) portions will next be described in greater detail with reference to FIGS. 2B and 2C. As shown in FIG. 2A, optical node 22A may include a plurality of wavelength selective switches (WSSs), such as WSSs 39-1 to 39-6. Wavelength selective switches are known components that can dynamically route, block and/or attenuate all the received optical signal groups input from and output to optical fiber links 30A, 13, and 30B. In addition to transmitting/receiving optical signal groups from these nodes, optical signal groups may also be input from or output to transmit and receive portions 38-2 and 38-1, respectively, in or near ROADM site 37.

As further shown in FIG. 2A, each WSS 39-1 to 39-6 can receive optical signal groups and selectively direct such optical signal groups to other WSSs for output from optical node 22A. For example, WSS 39-6 may receive optical signal groups on optical communication path 30A-1 and supply certain optical signal groups to WSS 39-3, while other are supplied to WSS 39-2. Those supplied to WSS 39-3 may be output to optical node 22D on optical communication path 30E-1, while those supplied to WSS 39-2 may be output to another optical node (not shown) on optical communication path 13-2. Also, optical signal groups input to optical node 22A on optical communication path 30E-2 may be supplied by WSS 39-4 to either WSS 39-5 and on to optical node 22B via optical communication path 30A-2 or WSS 39-2 and on to another node (not shown) via optical communication path 13-2. Moreover, WSS 39-1 may selectively direct optical signal groups input to optical node 22A from optical communication path 13-1 to either WSS 39-5 and onto optical node 22B via optical communication path 30A-2 or to WSS 39-3 and onto optical node 22D via optical communication path 30E-1.

WSSs 39-1, 39-4, and 39-6 may also selectively or controllably supply optical signal groups to receive portion 38-1 and optical signal groups may be selectively output from transmit portion 38-2 in optical node 22A. The optical signal groups output from transmit portion 38-2 may be selectively supplied to one or more of WSSs 39-3, 39-2, and 39-5, for output on to optical communication paths 30E-1, 13-2, and 30A-2, respectively.

Figure 2C:
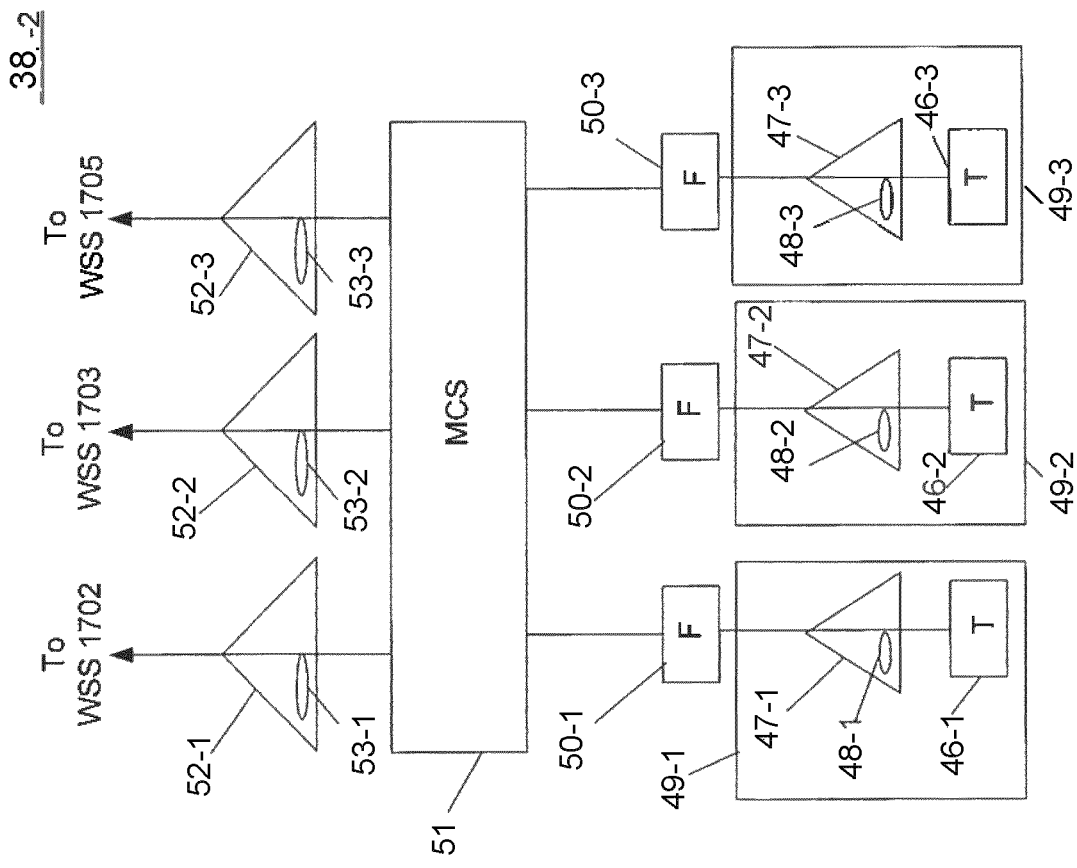
FIG. 2C is a block diagram of a receiver of the exemplary optical node of FIG. 2B.
Figure 2B:
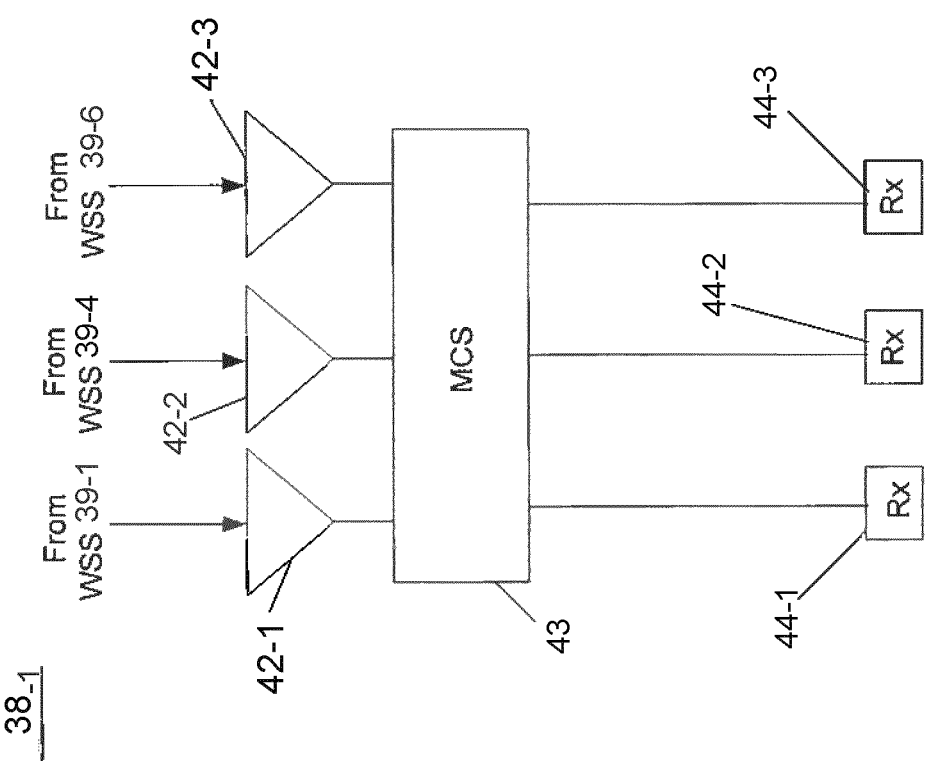
FIG. 2B is a block diagram of a transmitter of the exemplary optical node of FIG. 2A.

Transmit and receive portion 38-2/38-1 are shown in greater detail in FIGS. 2B and 2C. Receive portion 38-1 includes optical amplifiers 42-1 to 42-3 that receive optical signal groups from WSSs 39-1, 39-4, and 39-6, respectively. The optical amplifiers 42-1 to 42-3, may each include a segment of erbium doped fiber, which may be pumped to provide gain for the received optical signal groups. The amplified optical signal groups may then be supplied to a multi-cast switch (MCS) 43, which controllably directs the received optical signals to one of receivers (Rx) 44-1 to 44-3.

The receivers 44-1 to 44-3, may have an input that receives an optical signal group and supplies the optical signal group to a demultiplexer, such as arrayed waveguide grating (AWG). The AWG may separate the optical signals within the received group based on wavelength and supply each optical signal to a corresponding one of optical components. As noted above, the optical signals may be polarization multiplexed, such that a polarization splitter or decombiner may be provided in each receiver the separate the TE and TM components, for example, of each optical signal. The TE and TM components may then be processed separately. As further noted above, the TE and TM components may be modulated in accordance with an m-ary modulation format (m being an integer greater than or equal to 1), e.g., binary phase shift keying (BPSK), quadrature phase shift keying (QPSK), 8-QAM, 16-QAM or higher data rate modulation format, such that each is preferably subject to coherent detection to effectively demodulate and detect the data carried by each optical signal. Here, optical components may each include known optical hybrid circuitry, as well as a local oscillator laser, and the outputs of optical components may be supplied to respective photodetector circuitry (PDs). The optical signals may then be converted to corresponding electrical signals by PDs, each of which may include known balanced detectors. The electrical signals output from PDs are then provided to processing circuits, each of which includes known clock and data recovery circuitry to demodulate and output data carried by the optical signals in the optical signal group supplied to the AWG.

It is understood that receivers 44-2 to 44-3 may have the same or similar structure as the receiver 44-1 described above.

Returning to FIG. 2C, transmit portion 38-2 will next be described in greater detail. Transmit portion 38-2 includes a plurality of transmitters 46-1 to 46-3, each of which supply a corresponding optical signal group to a respective one of optical amplifiers 47-1 to 47-3. The transmitter 46-1, for example, includes a plurality of lasers, each of which supplies a corresponding unmodulated optical signal having a particular wavelength to a respective one of optical circuits. Each optical circuit may include optical modulators, splitters, polarization rotators, amplifiers, and other optical components for modulating, amplifying, and/or polarization multiplexing portions of the light output from each laser. Modulated optical signals output from each optical circuit are next combined by a known optical multiplexer, such as an AWG onto an output waveguide as an optical signal group. Each pair of laser and optical circuit may collectively constitute an optical source.

As noted above, in one example, the modulated optical signals may be polarization multiplexed, such that TE and TM components of each optical signal are separately modulated and combined. In that case, one or more polarization beam combiners may be provided in each transmitter to combine such components. In addition, known optical circuitry may be provided to modulate the TE and TM components in accordance with an m-ary modulation format, such as BPSK, QPSK, 8-QAM, 16-QAM or higher data rate modulation format.

It is noted that each optical signal within each optical signal group discussed above may have a wavelength near 1550 nm.

Returning to FIG. 2C, each optical amplifier 47-1 to 47-3 includes a corresponding segment of erbium doped fiber (48-1 to 48-3), which as noted above, can be pumped to provide gain over a range of wavelengths, including the wavelengths of optical signals in the optical signal groups output from transmitters 46-1 to 46-3. Transmitters 46-1 to 46-3 and optical amplifiers 48-1 to 48-3 may be provided in respective modules 49-1 to 49-3. Each of the modules 49-1 to 49-3 may be a line card, for example.

The amplified optical signal groups may next be supplied to a corresponding one of filters 50-1 to 50-3 and then provided to a multi-cast switch (MCS) 51, which switches the received optical signal groups to one of amplifiers 52-1 to 52-3, each of which including a corresponding one of erbium-doped fibers 53-1 to 53-3. Each optical amplifier, in turn, outputs the received optical signal groups, in amplified form, to a corresponding one of WSSs 39-2, 39-3, and 39-5. Thus, MCS 51 may be controlled to output a particular optical signal group to a desired WSS, and then onto a desired node. As a result, of such switching, optical node 22A is reconfigurable so that each optical signal group can be selectively or controllably output to any desired output, and thus to a desired node.

The optical node 22A also includes a roadm node controller 54 communicating with the SDN L0 network controller 24 via the network 26, and an optical channel monitor 55 supplying control information to the roadm node controller 54.

The optical channel monitor 55 includes circuitry to monitor the power of optical signals on the optical communication paths 13-1, 13-2, 30A-1, 30A-2, 30E-1 and 30E-2 to obtain network performance parameters, such as valid channel detection, center wavelength and an optical signal to noise ratio. The network performance parameters measured by the optical channel monitor 55 are supplied to the roadm node controller 54, and thereafter supplied to the SDN L0 network controller 24. As will be discussed below, the optical channel monitor 55 is included with at least two modes, i.e., a steady state mode and a restoration mode that have different scan rates for measuring the network performance parameters. In general, the scan rate during the steady state mode is slower than the scan rate during the restoration mode. For example, the scan rate during the steady state mode can be 1 second, and the scan rate during the restoration mode can be 0.1 seconds thereby resulting in a 10 times faster scan rate during the restoration mode. The scan rate during the restoration mode can be within a range of 2 to 10 times faster than the scan rate during the steady state mode.

Figure 3:
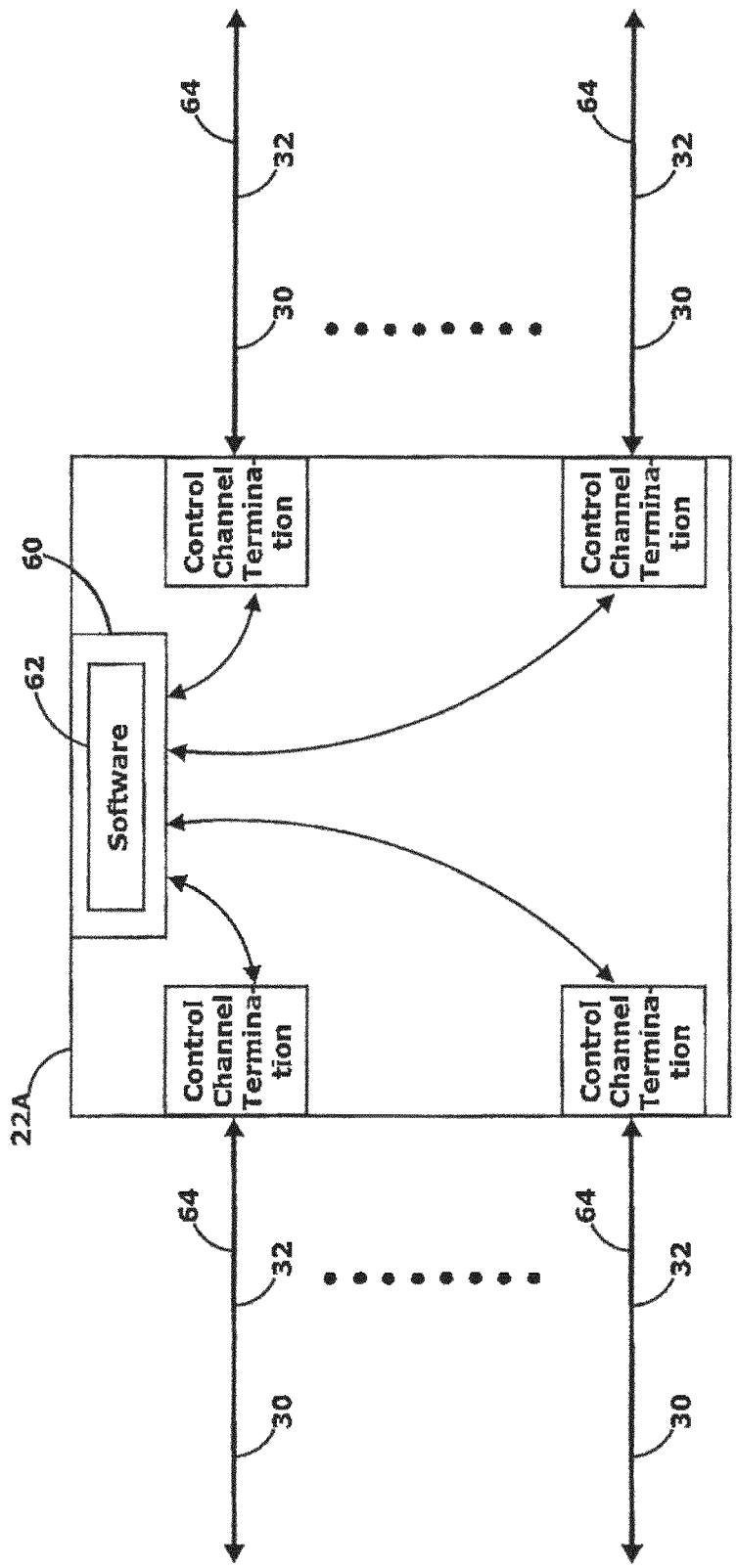
FIG. 3 is block diagram of another aspect of the exemplary node of FIG. 2.

As illustrated in FIG. 3, the exemplary optical node 22A, may receive one or more optical control signal 64, from one or more other optical nodes 22B-22n in in the optical transport network 20, containing information regarding the Operation, Administration, and/or Maintenance (OAM) of optical layers in the optical transport network 20. The optical control signal 64 may be carried via the Optical Supervisory Channel (OSC) 32, or any suitable optical control channel. The optical layer OAM information, such as status and defect information, is mapped to specific bits in OSC 32. The OAM information communicated for a given data signal may be based at least in part on the health of the hardware in the path of the data signal and the health of the optical data path itself. Methods and systems for transmitting and receiving OAM data within the OSC 32 are more fully described in the patent application identified by U.S. Ser. No. 13/452,413, titled "OPTICAL LAYER STATUS EXCHANGE OVER OSC-OAM METHOD FOR ROADM NETWORKS" filed on Apr. 20, 2012.

In general, the optical control signal 64 is terminated at the optical node 22A, as illustrated in FIG. 3, where the control module 60 extracts the optical layer overhead OAM information from the optical control signal 64 in the OSC 32. The optical node 22A may notify software 62 in the optical node 22A and/or may notify other optical nodes 22B-22n in the optical transport network 20 of the status of the optical layer, as indicated by the overhead information. In one embodiment, the optical node 22A inspects the optical control signal 64 for stable values before notifying the software 62 of the status of the optical layer. The filtering for stable values may be done in hardware, in which case, the association of filtering characteristics to fields may be fixed in the hardware code, for example, in a FPGA's code. Also, if granular notifications (interrupts) are provided to the software 62, the association of fields to interrupt bits may be fixed in the hardware code.

Additionally, the optical node 22A may write, with the software or with hardware, Operation, Administration, and/or Maintenance (OAM) information of the optical layers in the optical transport network 20 into overhead of the optical control signal 64 to be transmitted from the optical node 22A via the OSC 32. This information may include, for example, equipment status, incoming signal status, and/or connectivity information. Of course, the information may include any OAM information. The optical node 22A may then initiate, with the software, transmission of the optical control signal 64 via the Optical Supervisory Channel (OSC) 32, or any suitable optical channel.

Figure 4:
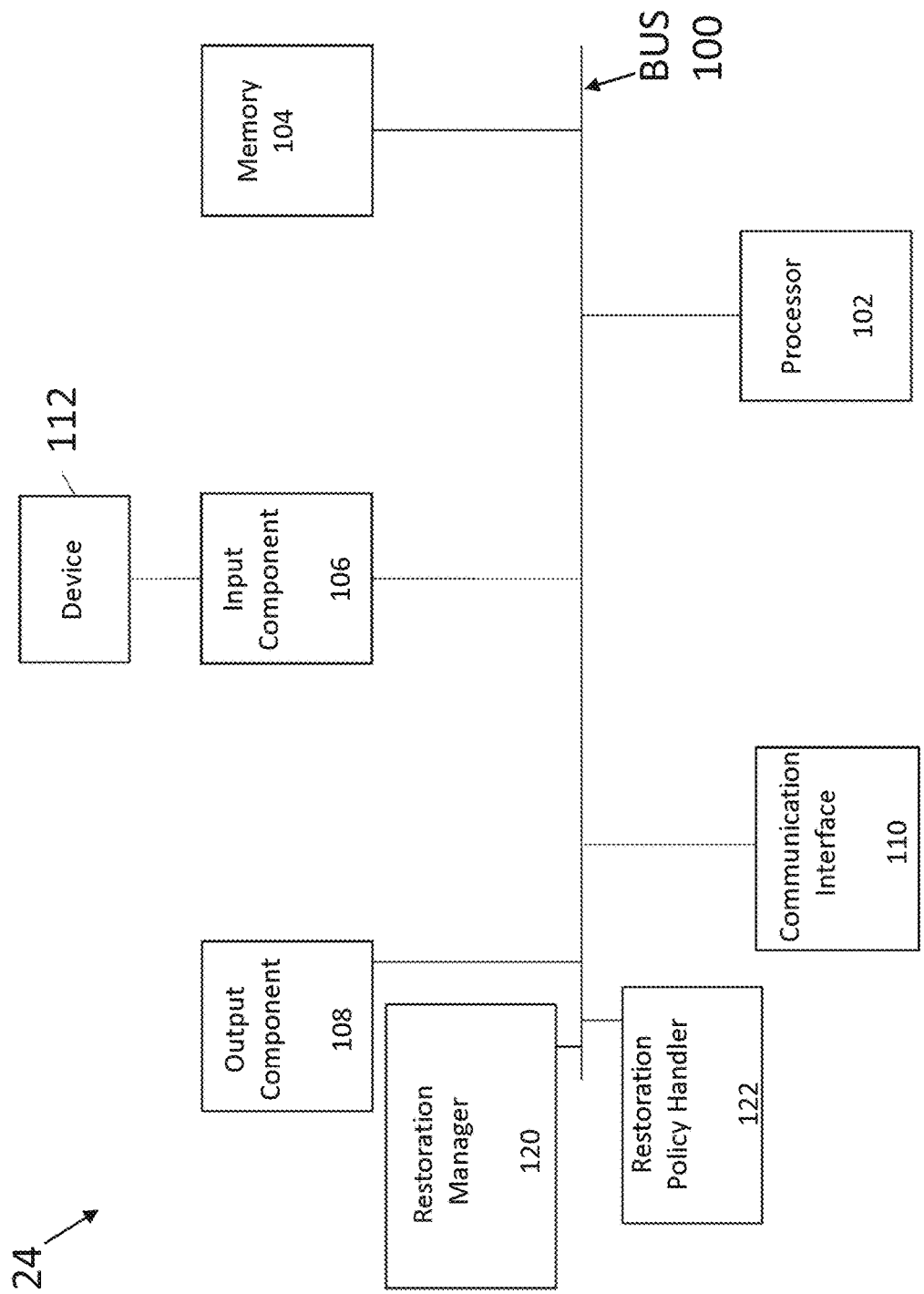
FIG. 4 is a block diagram of an exemplary SDN L0 Network Controller constructed in accordance with the present disclosure.

FIG. 4 is a diagram of example components of the SDN L0 network controller 24. Of course, the SDN L0 network controller 24 components may be distributed into multiple devices, but are preferably separate from any of the nodes 22A-22n.

SDN L0 network controller 24 may include a bus 100, a processor 102, a memory 104, an input component 106, an output component 108, and a communication interface 110. In some implementations, SDN L0 network controller 24 may include additional components, fewer components, different components, or differently arranged components than those illustrated in FIG. 4.

Bus 100 may include a path that permits communication among the components of SDN L0 network controller 24. Processor 102 may include a processor, a microprocessor, and/or any processing logic (e.g., a field-programmable gate array ("FPGA"), an application-specific integrated circuit ("ASIC"), etc.) that may interpret and execute instructions. Memory 104 may include a random access memory ("RAM"), a read only memory ("ROM"), and/or any type of dynamic or static storage device (e.g., a flash, magnetic, or optical memory) that may store information and/or instructions for use by processor 102.

Input component 106 may include any mechanism that permits a user to input information via a device 112 (e.g., a keyboard, a keypad, a mouse, a button, a switch, etc.). Output component 108 may include any mechanism that outputs information (e.g., a display, a speaker, one or more light-emitting diodes ("LEDs"), etc.). Communication interface 110 may include any transceiver-like mechanism, such as a transceiver and/or a separate receiver and transmitter that enables the SDN L0 network controller 24 to communicate with other devices and/or systems, such as the nodes 22A-22n via the network 26. The network 26 can be implemented as a wired connection, a wireless connection, or a combination of wired and wireless connections.

SDN L0 network controller 24 may perform various operations described herein. SDN L0 network controller 24 may perform these operations in response to processor 102 executing software instructions contained in a non-transitory computer-readable medium, such as memory 104. A computer-readable medium may be defined as a non-transitory memory device. A memory device may include space within a single storage device or space spread across multiple storage devices.

Software instructions may be read into memory 104 from another computer-readable medium or from another device via communication interface 110. Software instructions stored in memory 104 may cause processor 102 to perform processes that are described herein. Additionally, or alternatively, hardwired circuitry may be used in place of or in combination with software instructions to implement processes described herein. Thus, implementations described herein are not limited to any specific combination of hardware circuitry and software.

SDN L0 network controller 24 may include a restoration manager 120 and a restoration policy handler 122. Each of functional components 120 and 122 may be implemented using one or more components of the SDN L0 network controller 24. The restoration policy handler 122 may include multiple different restoration policies as options, such as full sequential vs. full parallel settings. A full sequential restoration policy brings up the links one by one in a serial manner, and full parallel restoration policy brings up the links in a parallel manner as disclosed herein. Selection of a particular restoration policy to be performed in restoring a restoration path can be selected in advance of a failure to a primary path. Restoration aggressiveness can be chosen by the SDN L0 network controller 24 or by a user (e.g., using the device 112). The restoration manager 120 is configured to monitor all or a subset of links within the optical transport network 20, obtain network performance information discussed above on a random or periodic basis (e.g., every 10 seconds) during operation of the primary path 34, and provide information to the Nodes 22A-22n in parallel to restore the restoration path as described herein. The restoration manager 120 may also be configured to determine restoration policy (e.g., fast/aggressive vs. slow/safe, i.e. parallel vs. sequential), monitoring the links 30a-m for faults. Selecting restoration paths from pre-selected paths or trigger Path Computation Engine (in the SDN L0 network controller 24) to calculate a new path for the service being affected by a fault. The restoration manager 120 may include a network topology database stored in the memory 104. The network topology database includes information indicative of the entire network topology of the optical transport network 20. The restoration manager 120 updates the network topology database with information indicative of any topology changes, as well as any updates to the network performance information. Because the SDN L0 network controller 24 is separate from the nodes 22A-22n, and communicates with the nodes 22A-22n in parallel, the SDN L0 network controller 24 can listen to (receive any network performance information updates) and control all of the nodes 22A-22n in parallel.

In general, upon failure of the primary path 34, the SDN L0 network controller 24 restores the restoration path 36 as follows. First, as indicated by a block 130, the SDN L0 Network Controller 24 detects a failure of the primary path 34, and then determines which communication link 30A or 30B has failed. This can be accomplished by analyzing fault metrics (such as back trace faults) and listening to/monitoring the head end node 22A, the intermediate node 22B and the tail end node 22C in parallel. Once the location of the failure is known, the SDN L0 network controller 24 branches to a block 132 and calculates a L0 restore path from the known network topology information (or the SDN L0 network controller 24 can select from a pre-calculated list based on preference). Then, as shown in block 134, the SDN L0 network controller 24 sends signals, in parallel, to each of the nodes 22A-22n in the restore path to determine whether the restore path is available. In this step, the SDN L0 network controller 24 is checking to see if any fault exists in the restore path, and/or for wavelength availability. If the restore path is unavailable, then the SDN L0 network controller 24 branches back to the block 132 to select another restore path. If the restore path is available, the SDN L0 network controller 24 branches to the block 136. In this block, the SDN L0 network controller 24 enables the restore path by controlling each of the nodes 22A-22n in a parallel fashion, and then determines and manages the power of the restore path from the head end node 22A to the tail end node 22C in a serial manner beginning with the head end node 22A.

Figure 6:
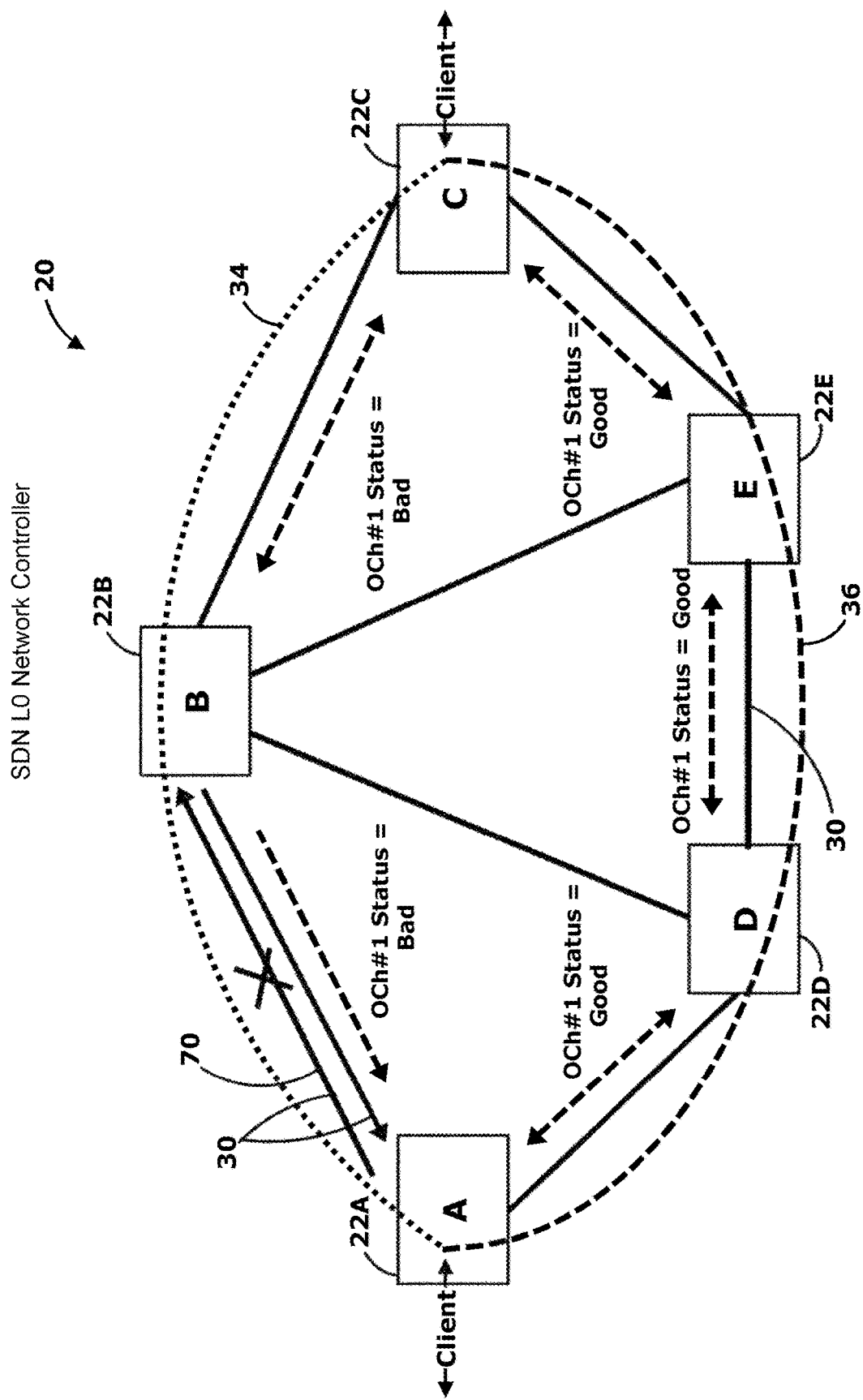
FIG. 6 is an illustration of the exemplary optical transport network of FIG. 1 in which a fault has occurred between a head end node and an intermediate node.

Turning now to FIG. 6, shown therein is the exemplary optical transport network 20 of FIG. 1, in which a failure, designated by "X", has occurred in the primary path 34. In this example, the failure "X" is the failure of a uni-directional fiber 70 in communication link 30 between optical node 22A and optical node 22B. Each node 22A-22n is capable of detecting failures and providing status updates to the SDN L0 network controller 24. The optical nodes 22A, 22B, and 22C are also monitoring the data traffic in the primary path 34 and/or restoration path 36, such as with the optical channel monitor 55. Node 22B detects uni-directional failure "X" and provides status information to the SDN L0 network controller 24 via the network 26 indicative of the location of the failure "X".

Upon detection of the location of the failure "X" in primary path 34, the SDN L0 network controller 24 signals the headend node 22A and the tail end node 22C, in a parallel fashion, to switch to the restore path as the restoration path 36 as the provider of the data traffic, using switches 58.

Figure 5:
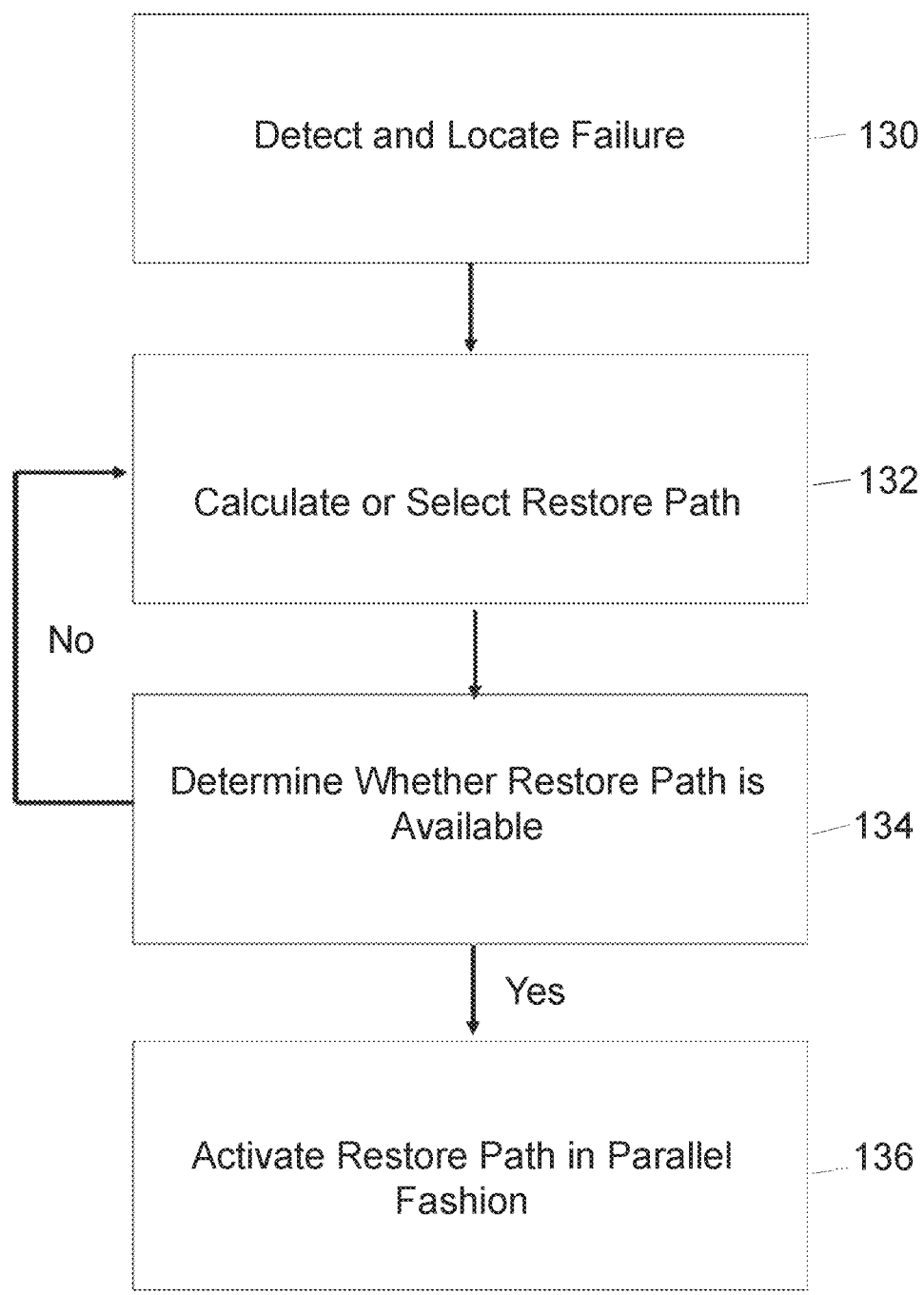
FIG. 5 is a flow diagram an exemplary monitoring and reporting process in accordance with the present disclosure.
Figure 7:
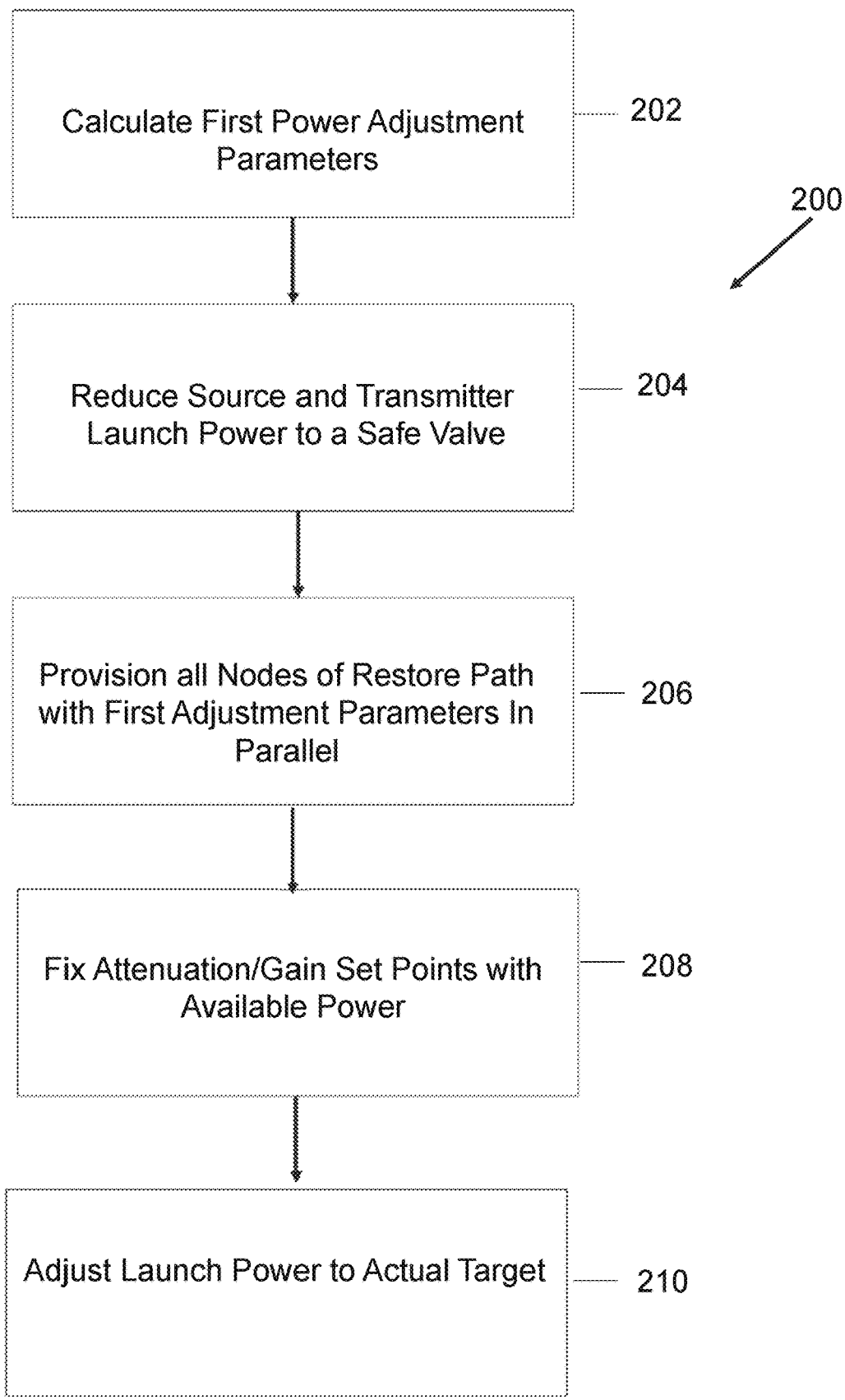
FIG. 7 is a flow diagram of an exemplary protection process for activating a restore path in accordance with the present disclosure.

FIG. 7 is a flow diagram of an exemplary protection process 200 for implementing the block 136 of FIG. 5 in accordance with the present disclosure. In a block 202, the restoration manager 120 of the SDN L0 Network Controller 24 calculates first power adjustment parameters configured to provision each of the nodes 22A, 22D, 22E and 22C in the restoration path 36. In one embodiment, each of the nodes 22A-22n in the restoration path includes a Reconfigurable Optical Add-Drop Module (ROADM). In this embodiment, the restoration manager 120 checks to see if the optical channel monitor 55 within the nodes 22A, 22D, 22E and 22C in the restore path is in the steady state mode. The restoration manager 120 accesses the network topology database stored in the memory 104, to obtain current network performance information, and then calculates the first power adjustment parameters using the network performance information. For example, provisioning gains, such as optical amplifier gains, can be calculated during an initial link design phase using a link design tool. In some embodiments, a user inputs the link topology, fiber loss/type information and requested services as input to the link design tool. The link design tool computes the required cards to be used in the optical nodes 22A, 22D, 22D and 22C, such as amplifiers, ROADMs and line modules. The link design tool also calculates the launch power into the fiber. Based on the resulting amp type and the calculated launch power, the link design tool can determine the default/initial gain set points for each amplifier. This can be used as the amplifier gain initially, i.e. during provisioning of the amplifiers for the first time. Based on estimates of the optical amplifier gains and loading, an estimated line spread at the tail end node 22C can be calculated. If traffic exists on the restoration path 36, then real-time measured line spread data at the tail end node 22C can be retrieved from the network performance data in the network topology database. In either case, the measured line spread or the estimated line spread and degree insertion losses from a ROADM Node Controller which interfaces with the SDN L0 network controller 24, for example, pre-stored for each established connection, e.g., the optical cross connect in the wavelength selective switch(es) is used to estimate passband attenuation at each wavelength selective switch cross connect at each of the nodes 22A, 22D, 22E and 22C in the path of the restoration path 36. The data in the network topology database is preferably captured from the nodes 22A, 22D, 22E and 22C when the optical channel monitor 69 within these nodes 22A, 22D, 22E and 22C is in the steady state mode.

In a block 204, the restoration manager 120 transmits a message to the head end node 22A of the restoration path to cause the head end node 22A to reduce a source of transmitter launch optical power on the restoration path to a safe value, e.g., −1 dB. Then, in a block 206, the restoration manager 120 transmits messages, in parallel, to the head end node 22A, the tail end node 22E and at least one intermediate node 22D and 22E to (1) provision all cross connects within the WSS on the restoration path with estimated passbands, and (2) set the power of all optical amplifiers in the restoration path or attenuation offsets in accordance with the estimated provisioning gains. In a block 208, the restoration manager 120 sends a message to the ROADM node controller 54 of the head end node 22A, and any other node 22 providing optical power into the restoration path, to supply optical power into the restoration path. The restoration manager 120 also sends a message to the head end node 22A, the tail end node 22C and the intermediate nodes 22D and 22E to cause the head end node 22A, the tail end node 22C and the intermediate nodes 22D and 22E to switch the optical channel monitors 55 to the restoration mode to enhance the scan rate of the optical channel monitors 55. Then, as power is being supplied into the restoration path, the restoration manager 120 monitors each of the nodes 22A, 22D, 22E and 22C and then supplies messages in a serial sequence to the nodes 22A, 22D, 22E and 22C to fix any attenuation/gain set point with available power in real time. Optionally, the restoration manager 120 can then send a message to the head end node 22A, and any other node 22 providing optical power into the restoration path, to adjust the launch power to a target power as indicated by block 210. Once the target power has been reached, the restoration manager 120 sends a message to the head end node 22A, the tail end node 22C and the intermediate nodes 22D and 22E to cause the head end node 22A, the tail end node 22C and the intermediate nodes 22D and 22E to switch the optical channel monitors 69 to the steady state mode to reduce the scan rate of the optical channel monitors 69.

Figure 8:
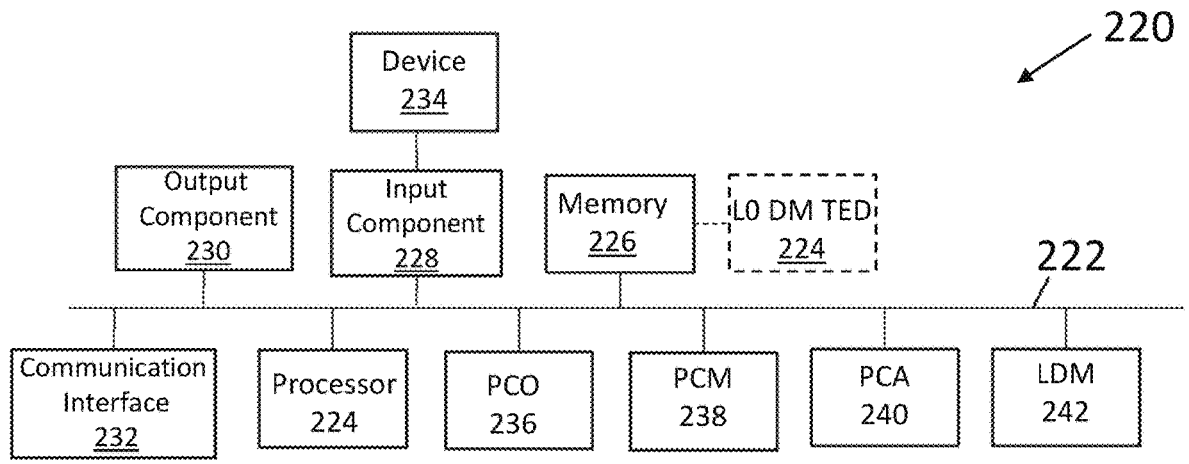
FIG. 8 is a block diagram of an exemplary L0 power controller constructed in accordance with the present disclosure.

FIG. 8 is a diagram of example components of a L0 power controller 220. It should be noted that the L0 power controller 220 components may be distributed into multiple devices, but are preferably separate from any of the nodes 22a-22n.

L0 power controller 220 may include a bus 222, a processor 224, a memory 226, an input component 228, an output component 230, a communication interface 232, a device 234, an orchestrating module (PCO) 236, a maintenance module (PCM) 238, an analytic module (PCA) 240, a link design module (LDM) 242, and a L0 dependency matrix traffic engineering database (DMTED) 244. In some implementations, L0 power controller 220 may include additional components, fewer components, different components, or differently arranged components than those illustrated in FIG. 8.

Bus 222 may include a path that permits communication among the components of L0 power controller 220. Processor 224 may include a processor, a microprocessor, and/or any processing logic (e.g., a field-programmable gate array ("FPGA"), an application-specific integrated circuit ("ASIC"), etc.) that may interpret and execute instructions. Memory 226 may include a random access memory ("RAM"), a read only memory ("ROM"), and/or any type of dynamic or static storage device (e.g., a flash, magnetic, or optical memory) that may store information and/or instructions for use by processor 224.

Input component 230 may include any mechanism that permits a user to input information via device 234 (e.g., a keyboard, a keypad, a mouse, a button, a switch, etc.). Output component 230 may include any mechanism that outputs information (e.g., a display, a speaker, one or more light-emitting diodes ("LEDs"), etc.). Communication interface 232 may include any transceiver-like mechanism, such as a transceiver and/or a separate receiver and transmitter that enables the L0 power controller 220 to communicate with other devices and/or systems, such as the nodes 22A-22n via the transport network 20. The transport network 20 can be implemented as a wired connection, a wireless connection, or a combination of wired and wireless connections.

L0 power controller 220 may perform various operations described herein. L0 power controller 220 may perform these operations in response to processor 224 executing software instructions contained in a non-transitory computer-readable medium, such as memory 226. A computer-readable medium may be defined as a non-transitory memory device. A memory device may include space within a single storage device or space spread across multiple storage devices.

Software instructions may be read into memory 226 from another computer-readable medium or from another device via communication interface 232. Software instructions stored in memory 226 may cause processor 224 to perform processes that are described herein. Additionally, or alternatively, hardwired circuitry may be used in place of or in combination with software instructions to implement processes described herein. Thus, implementations described herein are not limited to any specific combination of hardware circuitry and software.

The PCO 236 orchestrates operations associated with L0 services including, for instance, service creation/deletion/modification either during service activation or service restoration. The PCO 236 supports power control models that are relevant to different operation models including, for instance, OpenConfig, OpenROADM and Infinera OLS model (OpenOLS).

The PCM 238 causes the L0 power controller 220 to perform periodic maintenance over a L0 domain of the transport network 20 including orchestration of the carrier power level, control of transmission line controller processes associated with an optical transmission line, and monitoring all control parameters (e.g., gain, attenuation, and tilt targets). The periodic maintenance is designed to catch deviations from target power levels within the transport network 20 due to exemplary factors such as temperature, aging, physical disturbances, etc. in the transport network 20. The periodic maintenance can be run asynchronously on the entire transport network 20.

Components such as, for instance, in-line amplifiers (elements 322a and 322b in FIG. 11), ROADM nodes (elements 320a, 320b, and 320c in FIG. 11), or each interface of the ROADM nodes (e.g., degrees elements 262 and 264 in FIG. 10 and/or optical add/drop interfaces element 266 in FIG. 10) of the transport network 20 may be target points for the periodic maintenance. Each of the target points may be provided with a target power and a monitoring tool (not shown), e.g., a photo-diode, an optical power monitor (OPM), and/or optical channel monitor (OCM). The target power, or power spectrum for each optical channel or service is received with the service definition. The target power may be stored, for instance, in the memory 226 associated with the target point.

The PCM 238 communicates with the monitoring tools of the target points through the communication interface 232 using streaming services and receives data corresponding to the operation of the target point. The PCM 238 compares the operational data of the target point to the target power associated with that target point and determines if there is a convergence. If there is a convergence, the L0 power controller 220 traces the affected service or services using a dependency matrix that will be described further herein until the L0 power controller 220 localizes the change. Once the change is localized, the L0 power controller 220 begins executing power controls starting from the location of the change.

The PCA 240 is configured to analyze network performance to derive patterns of degradation. Based on the patterns of degradation, the L0 power controller 220 performs link optimization.

The LDM 242 calculates optimal signal launch powers for each fiber span in the network using different constraints such as, for instance, performance, cost, margin, etc. Based on link design, the LDM 242 calculates an aggregate target power where multiple services are combined. For instance, when optical channels are multiplexed in a ROADM node, LDM 242 calculates the aggregate target power of the multiplexed optical channels.

The DM TED 244 is configured to store network control status and dependency information. The dependency information stored in the DM TED 244 includes dependencies between the individual carrier(s), the ROADM node, and the optical transmission line between ROADM nodes. When a wavelength service (i.e. a channel) is added to or removed from the transport network 20, an entry corresponding to the wavelength service is added or removed from the DM TED 244.

Figure 9:
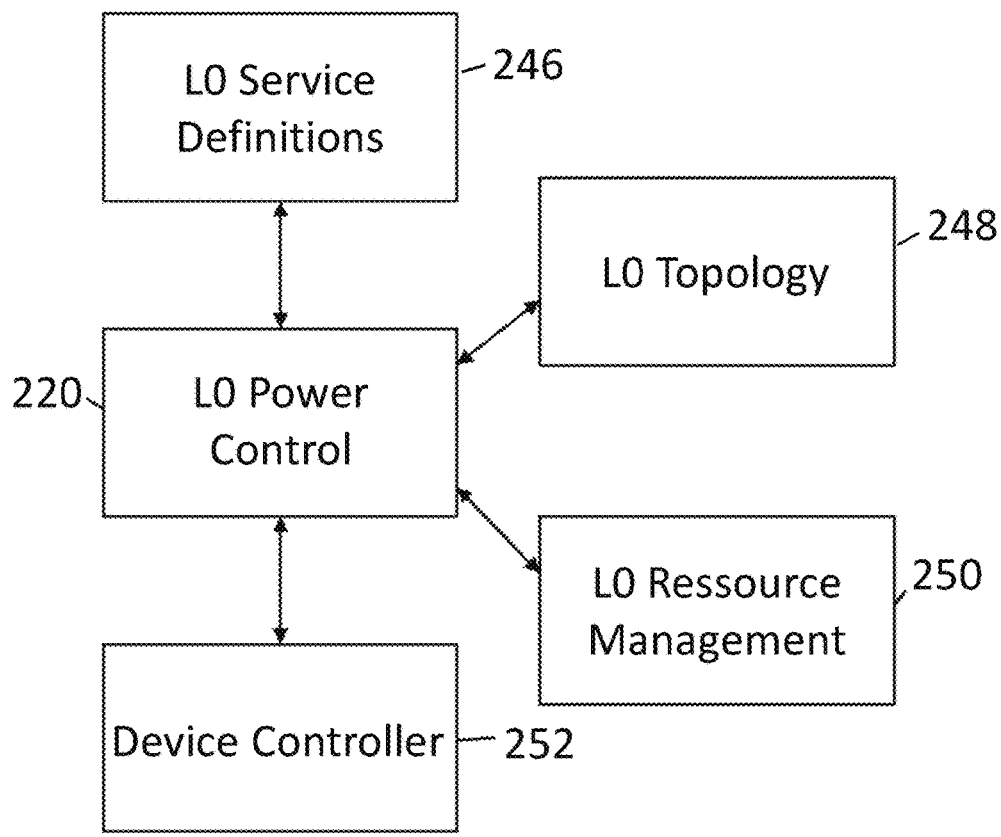
FIG. 9 is a block diagram of interactions between constituent components of an SDN architecture optical network and an L0 power controller in accordance with the present disclosure.

FIG. 9 is a block diagram illustrating how the L0 power controller 220 interacts with components that may be present on the transport network 20. The L0 power controller 220 receives L0 service definitions 246 from SDN L0 network controller 24.

Figure 11:
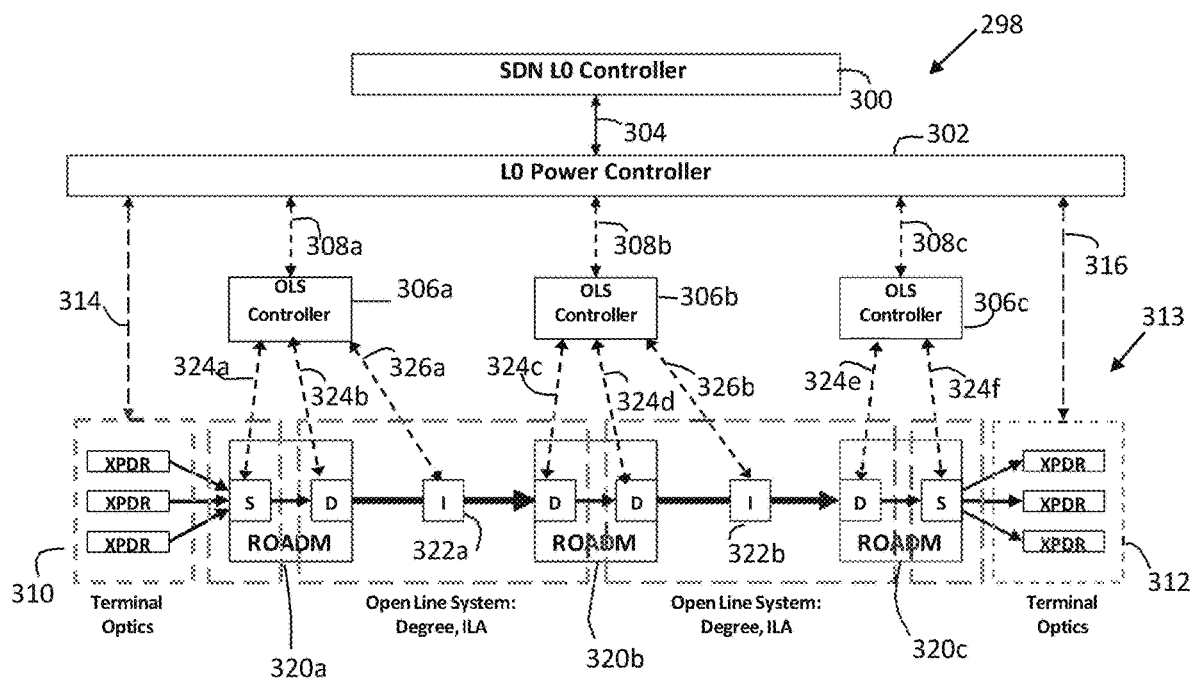
FIG. 11 is an illustration of an exemplary SDN architecture optical transport network in accordance with the present disclosure.

The L0 power controller 220 receives topology information 248 representative of the mapping between the network view and the model present in an OLS controller 306a (FIG. 11).

L0 resource management 250 provides the L0 power controller 220 with information associated with network resources such as ROADM nodes 320a-320c (FIG. 11), degree nodes 262 and 264 (FIG. 10), SRG A/D node 266 (FIG. 10), links, spans, and in-line amplifiers 322a and 322b (FIG. 11), for instance.

Device controller 252 provides the L0 power controller 220 with information indicative of a mapping between a data model present in the L0 power controller 220 and a data model present in OLS controllers 306a-306c (FIG. 11).

Figure 10:
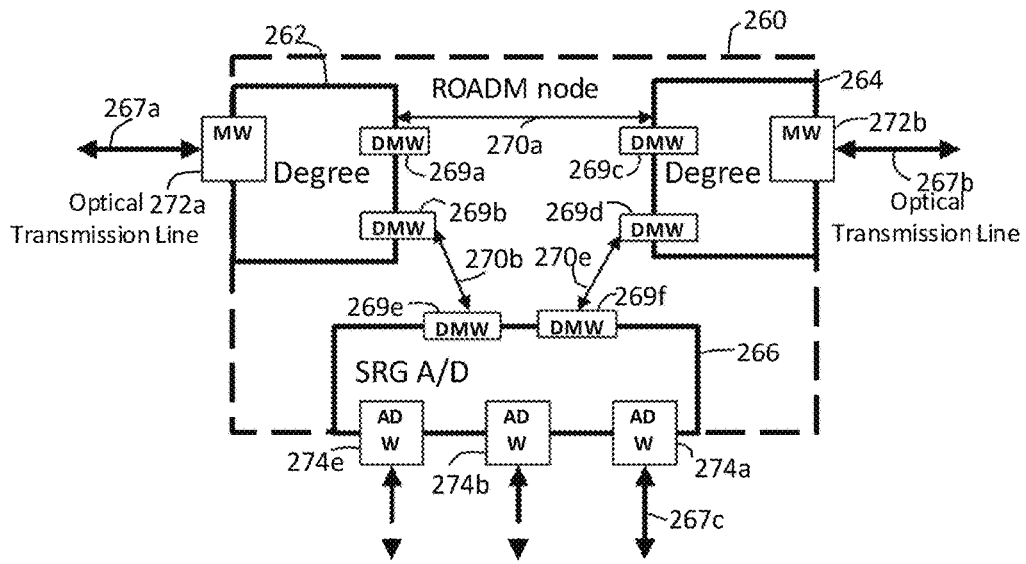
FIG. 10 is an illustration of an exemplary disaggregated optical node in accordance with the present disclosure.

FIG. 10 illustrates an example of an optical node 260 which is a ROADM node that has been disaggregated into a first degree node 262, a second degree node 264, and a shared risk group add/drop node (SRG A/D node) 266 that interconnect optical fiber links 267a, 267b, and 267c.

The first degree node 262, second degree node 264, and SRG A/D node 266 are provided with degree multiple optical dense wavelength division multiplexing interface (DMW) 269a-269f that interconnect the first degree node 262, second degree node 264, and SRG A/D node 266 through optical spectrum connections 270a-270c. It should be noted that in some embodiments, DMW 269a-269f may be used to interconnect directly with terminal optics (not shown).

The first degree node 262 and the second degree node 264 are provided with at least one multiple optical dense wavelength division multiplexing interface (MW) 272a and 272b, respectively, which interface with fiber links 267a and 267b, respectively.

The SRG A/D node 266 is provided with at least one add/drop multiple optical dense wavelength division multiplexing interface (ADW) 274a-274c that interface with optical fiber links such as optical fiber link 267c to connect the SRG A/D node 266 with terminal optics.

FIG. 11 illustrates an example SDN architecture 298 where a centralized SDN L0 network controller 300 manages L0 service between terminal optics 310 and 312 over a reconfigurable optical network 313. The transport network 20 is an example of the reconfigurable optical network 313.

The SDN L0 network controller 300 communicates with L0 power controller 302 through an open interface 304 to exchange information about L0 service definitions that include, for instance, XPDR information and ROADM optical spectrum connection.

The L0 power controller 302 communicates with the OLS controllers 306a-306c to implement the services into the different components that define the reconfigurable optical network 313 through open interfaces 308a-308c.

The L0 power controller 302 communicates with the terminal optics 310 and 312 to exchange information regarding the power control of the terminal optics 310 and 312 through open interfaces 314 and 316, respectively.

In the illustrated embodiment, the OLS controllers 306a-306c manage ROADM node 320a-320c and ILA 322a-322b components through open interfaces 324a-324f and 326a-326b, respectively.

Figure 12:
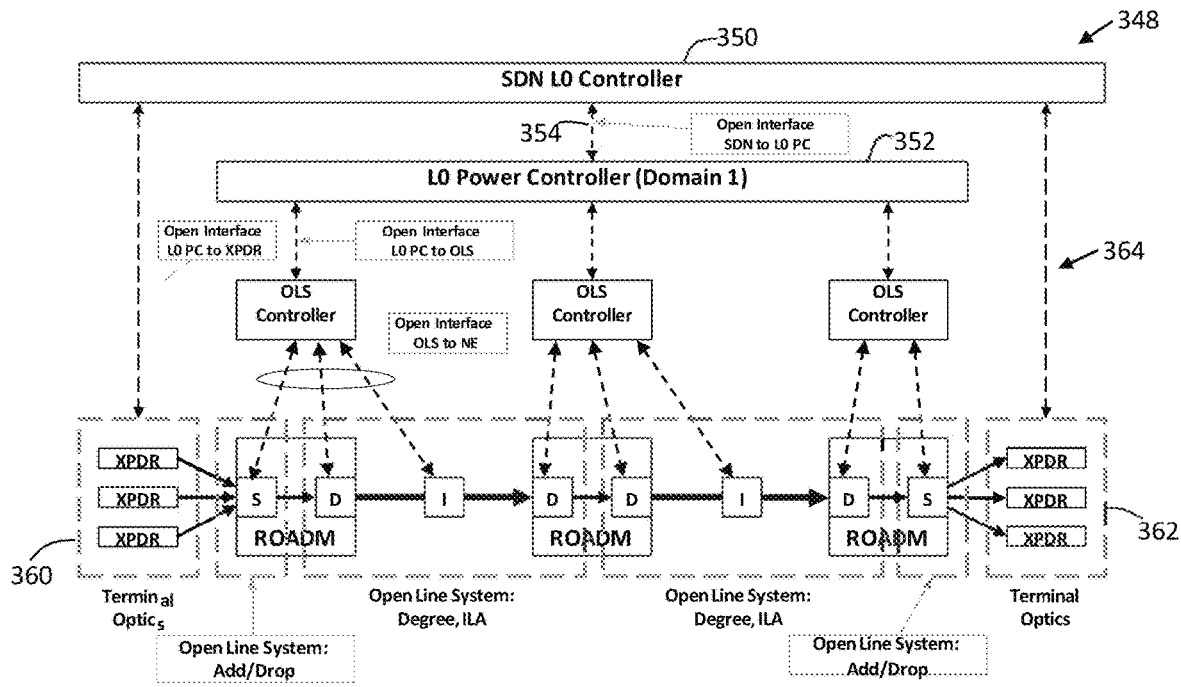
FIG. 12 is an illustration of another exemplary SDN architecture optical transport network in accordance with the present disclosure.

FIG. 12 illustrates another example SDN architecture 348 where a SDN L0 network controller 350 manages L0 service between terminal optics 360 and 362 over a reconfigurable optical network 364.

In SDN architecture 348, SDN L0 network controller 350 is responsible for configuration and monitoring of terminal optics 360 and 362 to include any power control information such as the optical power target of transmitters.

SDN L0 network controller 350 communicates with a L0 power controller 352 through an open interface 354 to exchange information about the L0 service definitions. L0 power controller 352 is responsible for monitoring and controlling network components between the terminal optics 360 and 362.

Figure 13:
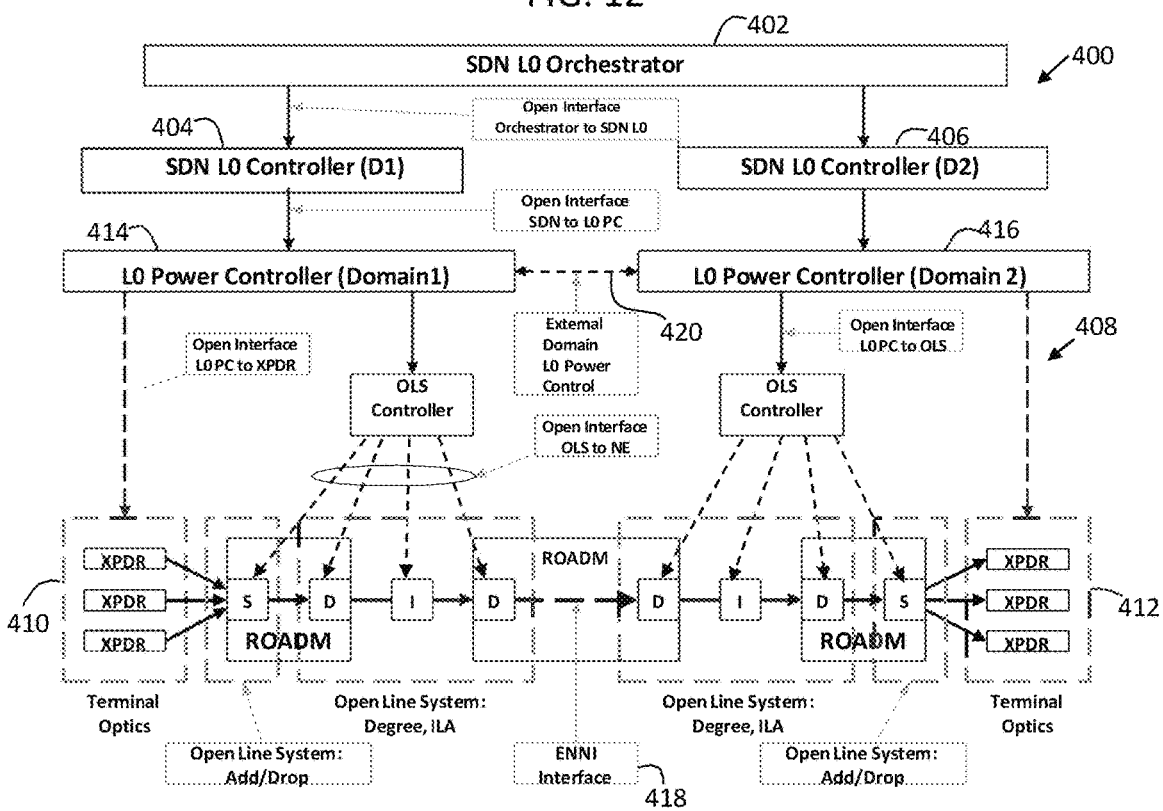
FIG. 13 is an illustration of an exemplary multi-domain SDN architecture optical transport network in accordance with the present disclosure.

FIG. 13 illustrates an example multi-domain SDN architecture 400 where a SDN L0 network orchestrator 402 manages multiple SDN L0 network controllers 404 and 406 to orchestrate the operation of a multi-domain optical network 408 beginning with terminal optic 410 and ending at terminal optic 412.

For each SDN L0 network controller 404 and 406, an L0 power controller 414 and 416 exists to manage the multi-domain optical network 408 to control the optical power. Control information is exchanged between L0 power controllers 414 and 416 over external domain L0 power control interface 420.

An external network to network interface (ENNI) 418 optically interconnects each domain of the multi-domain optical network 408. The ENNI 418 information is known by the L0 power controllers 414 and 416 that participate in this interconnection.

It should be noted that SDN L0 network controllers 300, 350, 404 and 406 and SDN L0 network orchestrator 402 may be constructed substantially the same as SDN L0 network controller 24 and L0 power controllers 302, 352, 414, and 416 may be constructed substantially the same as L0 power controller 220.

Figure 14A:
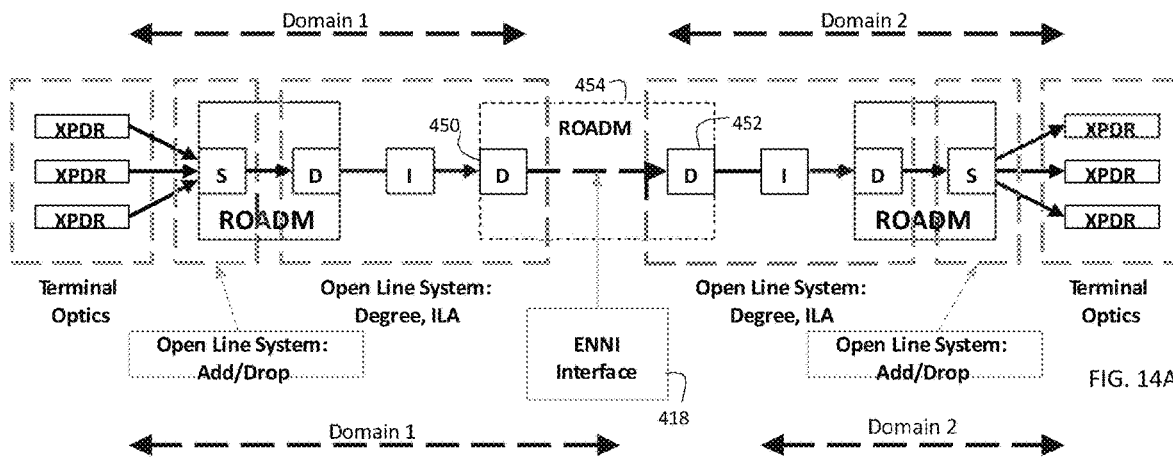
FIG. 14A is an illustration of an exemplary multi domain optical transport network with an external network to network interface interconnecting a first degree node of a first domain and a second degree node of a second domain in accordance with the present disclosure.

As illustrated in FIG. 14A, the ENNI 418 may be located between different components of an open line system. For instance, the ENNI 418 may be connected between a first degree 450 and a second degree 452 of a disaggregated ROADM 454 via DMW interfaces (not shown).

Figure 14B:
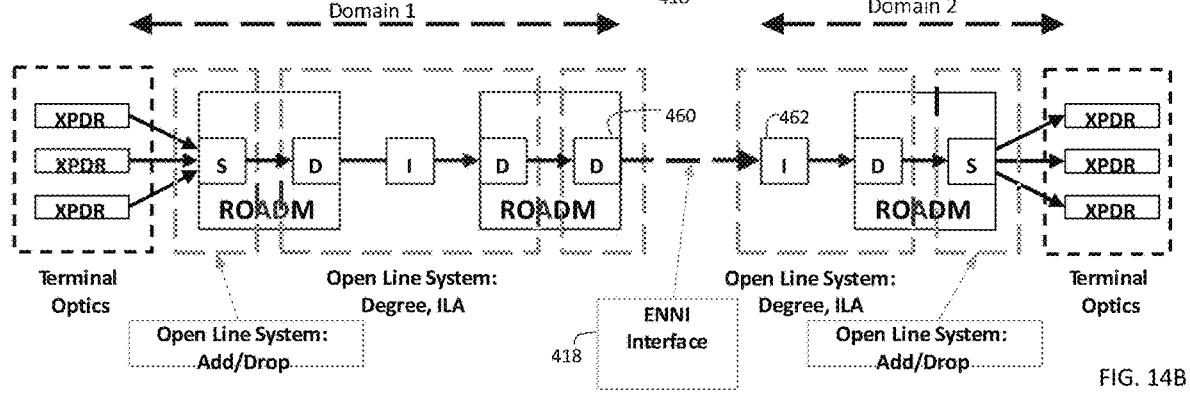
FIG. 14B is an illustration of another exemplary multi domain optical transport network with an external network to network interface interconnecting a first degree node of a first domain and an ILA of a second domain in accordance with the present disclosure.

As illustrated in FIG. 14B, the ENNI 418 may be connected between a degree 460 and an adjacent ILA 462.

Figure 14C:
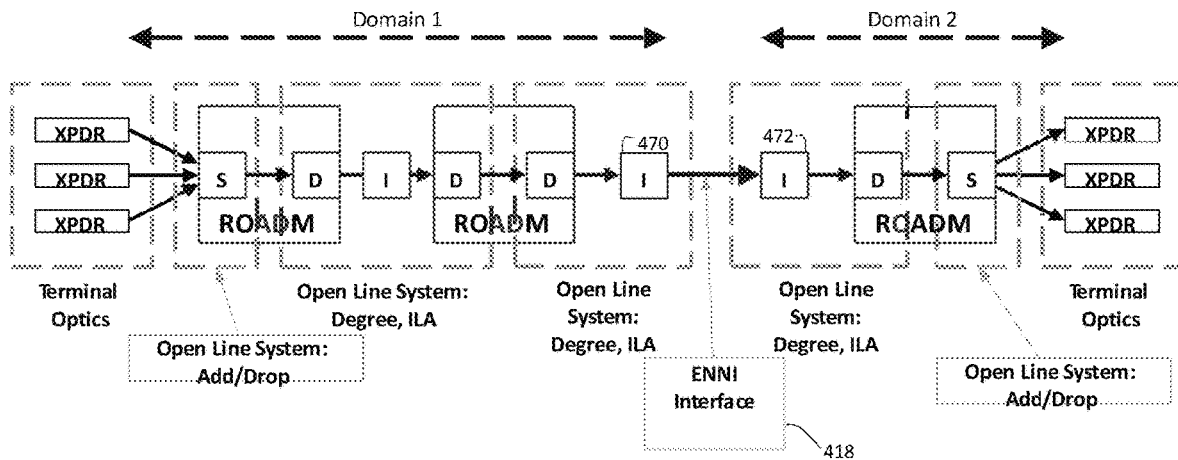
FIG. 14C is an illustration of an exemplary multi domain optical transport network with an external network to network interface interconnecting a first ILA of a first domain and a second ILA of a second domain in accordance with the present disclosure.

As illustrated in FIG. 14C, the ENNI 418 may be connected between a first ILA 470 and a second ILA 472.

Figure 15:
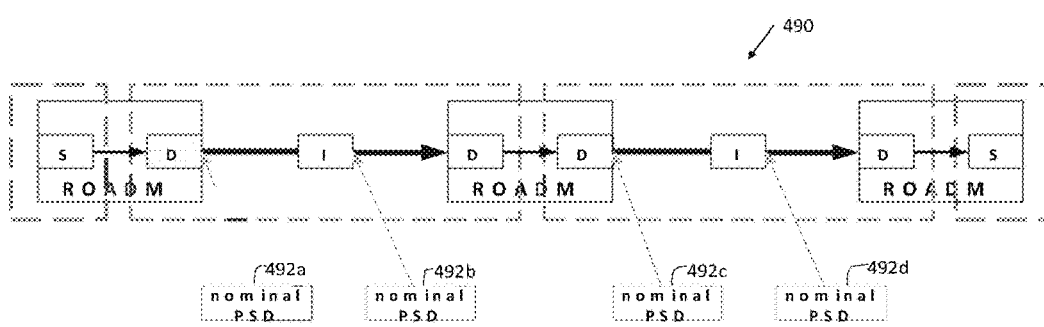
FIG. 15 is an illustration of an optical network segment having power spectral density measuring points in accordance the present disclosure.

FIG. 15 illustrates an optical network segment 490 illustrating possible power spectral density (PSD) measuring points 492a-492d in the optical network segment 490.

Figure 16:
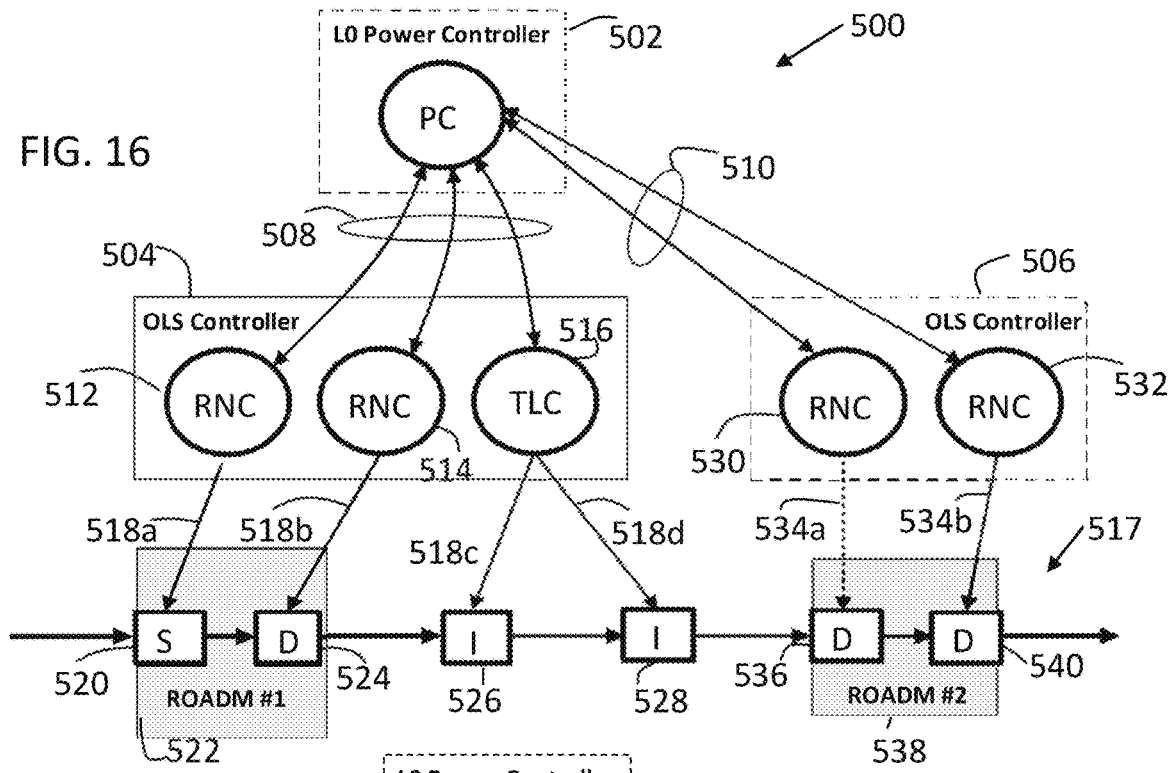
FIG. 16 is a block diagram illustrating exemplary interconnections between network elements in an optical network in accordance with the present disclosure.

FIG. 16 is a block diagram illustrating a portion of a SDN architecture 500 having a L0 power controller 502 (similar to L0 power controller 220) communicating with a first OLS controller 504 and a second OLS controller 506 over open interface 508 and open interface 510, respectively.

First OLS controller 504 is provided with a first ROADM node controller (RNC) 512, a second RNC 514, and a transmission line controller (TLC) 516. The first and second RNC 512 and 514 and the TLC 516 communicate with elements of an optical network segment 517 over open interfaces 518a-518d. In particular, the first RNC 512 communicates with SRG A/D node 520 of a disaggregated ROADM node 522 over open interface 518a. The second RNC 514 communicates with degree node 524 over open interface 518b. The TLC 516 communicates with a first ILA 526 over open interface 518c. The TLC 516 communicates with a second ILA 528 over open interface 518d.

Second OLS controller 506 is provided with a third RNC 530 and a fourth RNC 532. The third and fourth RNC 530 and 532 communicate with elements of the optical network segment 517 over open interfaces 534a-534b. In particular, the third RNC 530 communicates with degree node 536 of a disaggregated ROADM node 538 over open interface 534a. The fourth RNC 532 communicates with degree node 540 over open interface 34b.

Figure 17:
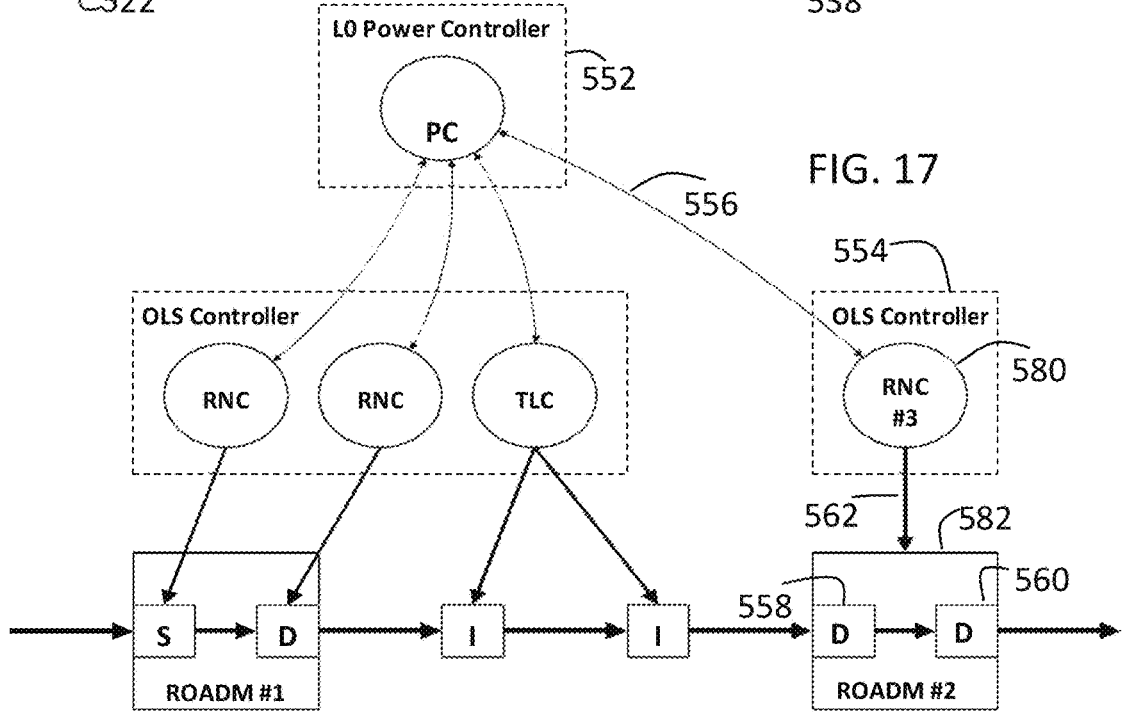
FIG. 17 is a block diagram illustrating exemplary interconnections between network elements in an optical network in accordance with the present disclosure.

It should be noted that a single RNC may provide power control of all elements of a ROADM node instead of one RNC for each element as illustrated in FIG. 16. By way of non-limiting illustration, in FIG. 17, an RNC 580 provides power control of all elements of a ROADM node 582. In such an embodiment, L0 power controller 552 communicates with OLS controller 554 over open interface 556. OLS controller communicates with the RNC 580 and RNC 580 communicates with a first degree 558 and a second degree 560 of the ROADM node 582 over open interface 562.

Figure 18:
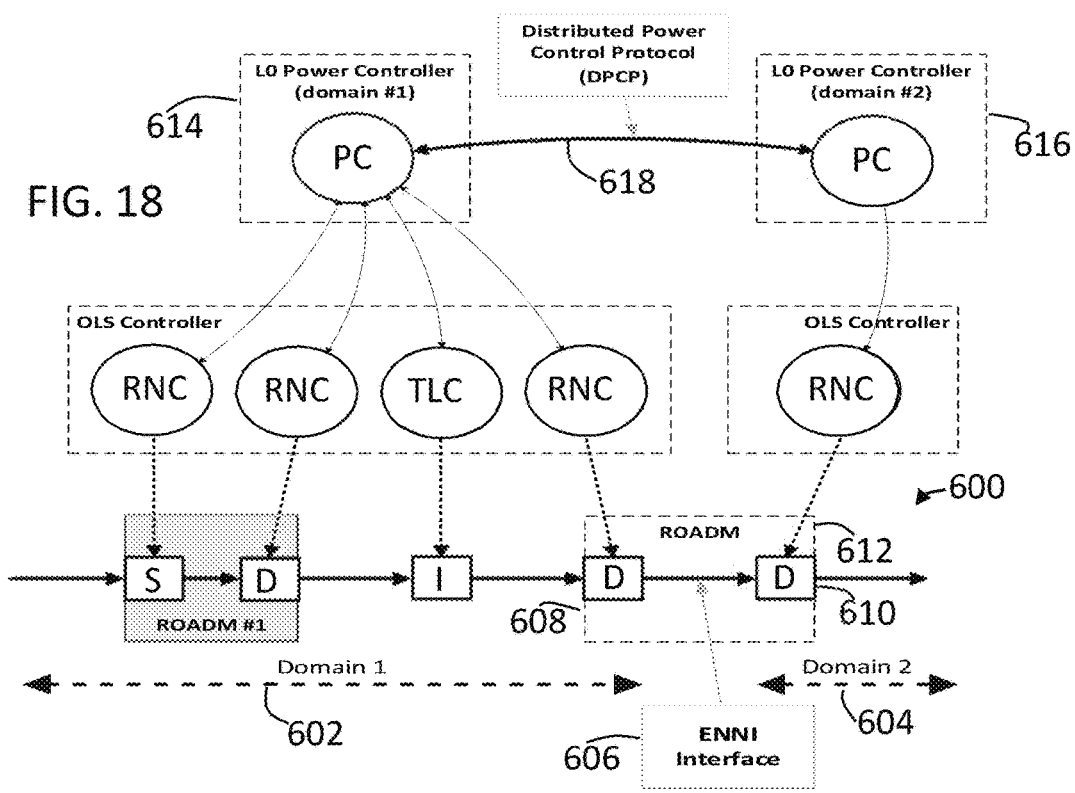
FIG. 18 is a block diagram illustrating exemplary interconnections between network elements in a multi-domain optical network in accordance with the present disclosure.

FIG. 18 illustrates a multi-domain optical network 600 having a first domain 602 and a second domain 604 interconnected through an ENNI interface 606 illustrated as an express connection between a first degree 608 and a second degree 610 of a ROADM node 612. In the illustrated embodiment, a first L0 power controller 614 provides power control for network elements of the first domain 602 and a second L0 power controller 616 provides power control for network elements of the second domain 604. Control information is exchanged between the first L0 power controller 614 and the second L0 power controller 616 over an external domain L0 power controller interface 618.

To communicate a state of each L0 power controller 614 and 616 over the external domain L0 power controller interface 618, the first L0 power controller 614 and the second L0 power controller 616 use a communication protocol such as Distributed Power Control Protocol (DPCP), for instance. This way, the first and second L0 power controllers 614 and 616 are able to orchestrate and maintain a multi-domain optical network.

Figure 19:
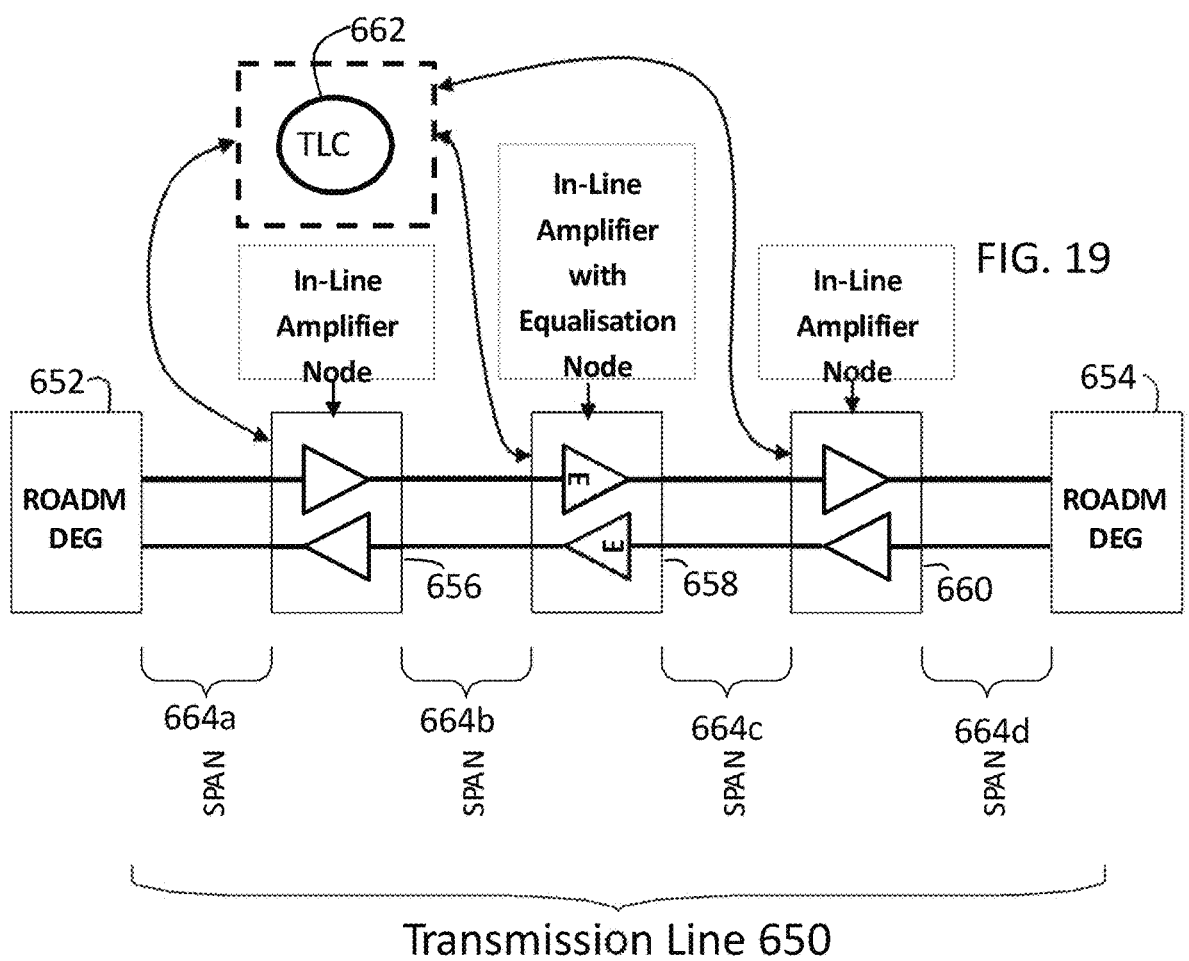
FIG. 19 is an illustration of an exemplary optical transmission line of an optical transport network in accordance with the present disclosure.

FIG. 19 illustrates an optical transmission line 650 between a first degree node 652 and a second degree node 654. Generally, optical transmission line 650 are provided with one or more in-line optical amplifiers (ILAs) to boost signal power and extend transmission distance. In some embodiments, some of the ILAs may be provided with spectrum equalizers to correct for the line spread or the gain tilt of the optical amplifiers. In the illustrated embodiment, the transmission line 650 is provided with a first ILA 656, a second ILA 658, and a third ILA 660.

The process of controlling the power within optical transmission line 650 is governed by a transmission line controller (TLC) 662. TLC 662 monitors the input and output power of each control loop in the optical transmission line 650 (such as gain controls on an erbium doped fiber amplifier, for instance) and correct the amplifier gain in relation to the ingress optical power and to an estimator of the total output power that should be present at the output of the ILA.

The TLC 662 interfaces with an L0 power controller 220 (FIG. 8) as described herein, however, it is an abstraction layer for the lower level controls—such as ILA control loops. Therefore, TLC 662 may govern multiple control loops and may implement the orchestration of the execution of those control loops within itself.

The L0 power controller 220 ensures target powers calculated by the LDM 242 (FIG. 8) are achieved in an optical network. LDM 242 calculates the optimal signal launch powers for each fiber span 664a-664d in the optical transmission line 650. The optimization can be done with different constraints (e.g., performance, cost, margin, etc.). In order to achieve the design objectives, the L0 power controller 220 performs periodical maintenance checks to catch deviations from the power targets. The deviations can be due to several reasons including, but not limited to, temperature, aging, physical disturbances, etc.

Figure 20:
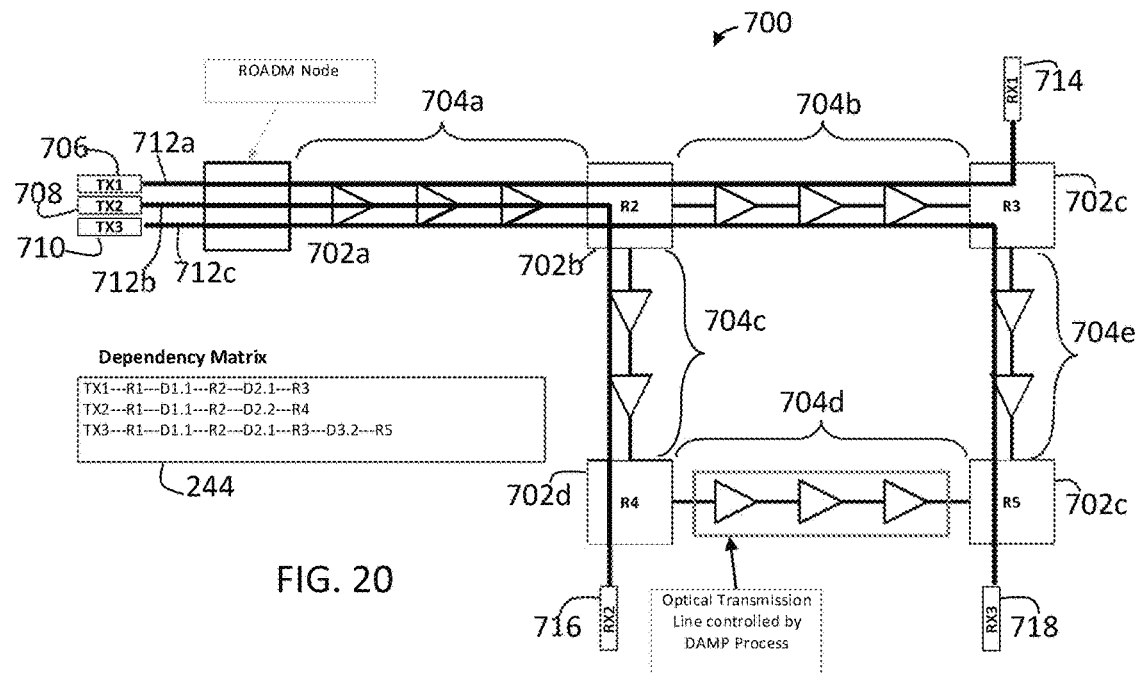
FIG. 20 is an illustration of a dependency matrix of an optical transport network in accordance with the present disclosure.

Each element in the optical network (e.g., first degree 652, second degree 654, first ILA 656, second ILA 658, and third ILA 660) is a target point. Each target point has a target power and a monitoring tool (Photo-diode and/or OCM). The L0 power controller 220 runs periodic audits at the targeting points through streaming services to catch deviations from the power targets. Each element in the optical network includes an API that support streaming of the monitored parameters. The streaming services can use a communication mechanism like IP over Ethernet over the OSC or DCN channel that is normally present in the optical network. Periodic audits can be run asynchronously on the entire network FIG. 20 illustrates an exemplary ROADM network 700 having a plurality of ROADM nodes 702a-702e interconnected by optical transmission lines 704a-704e. A first optical transmitter 706, a second optical transmitter 708, and a third optical transmitter 710 provide optical carrier signals 712a-712c which are carried over the ROADM network 700 to a first optical receiver 714, a second optical receiver 716, and a third optical receiver 718, respectively. The optical carrier signals 712a-712c are transmitted through various ROADM nodes 702a-702e interconnected by optical transmission lines 704a-704e of the ROADM network 700. When an optical carrier 712a-712c requires the use of an optical transmission line 704a-704e or a ROADM node 702a-702e, the optical carrier is said to be dependent on that network element. For instance, optical carrier 712a is transmitted through ROADM node 702a, optical transmission line 704a, ROADM node 702b, optical transmission line 704b, and ROADM node 702c. Consequently, optical carrier 712a is dependent on ROADM node 702a, optical transmission line 704a, ROADM node 702b, optical transmission line 704b, and ROADM node 702c.

A L0 power controller such as L0 power controller 220 described above is configured to gather and store dependency information in the DM TED 244. The DM TED 244 is configured to store network control status and dependency information. The dependency information stored in the DM TED 244 includes dependencies between the individual optical carrier(s), the ROADM node, and the optical transmission line between ROADM nodes. When a wavelength service (i.e. an optical channel) is added to or removed from the ROADM network 700, an entry corresponding to the optical channel is added or removed from the DM TED 244.

A power control process in the L0 power controller 220 uses a backtracking process to resolve optical power issues that happen in the ROADM network 700. The power control process is triggered by the detection of deviations in optical channel power at ROADM degree locations or deviations in the total output or input power present at target points (e.g., ILAs) in optical transmission lines.

The L0 power controller 220 runs periodic maintenance cycles or audits to monitor all control parameters (e.g., gain, attenuation, tilt targets) and compare the control parameters to targets. When a deviation is detected for an optical channel, the L0 power controller 220 backtracks the path of the optical channel using the DM TED 244 to validate the quality of the ROADM network 700. When a starting point for the deviation is found, the L0 power controller 220 starts power repairs from that point. When the start point of a deviation is an ILA, the system backtracks all affected optical channels and starts to repair from a point where optical channels can be re-routed (e.g., a degree node or an SRG A/D node).

Figure 21:
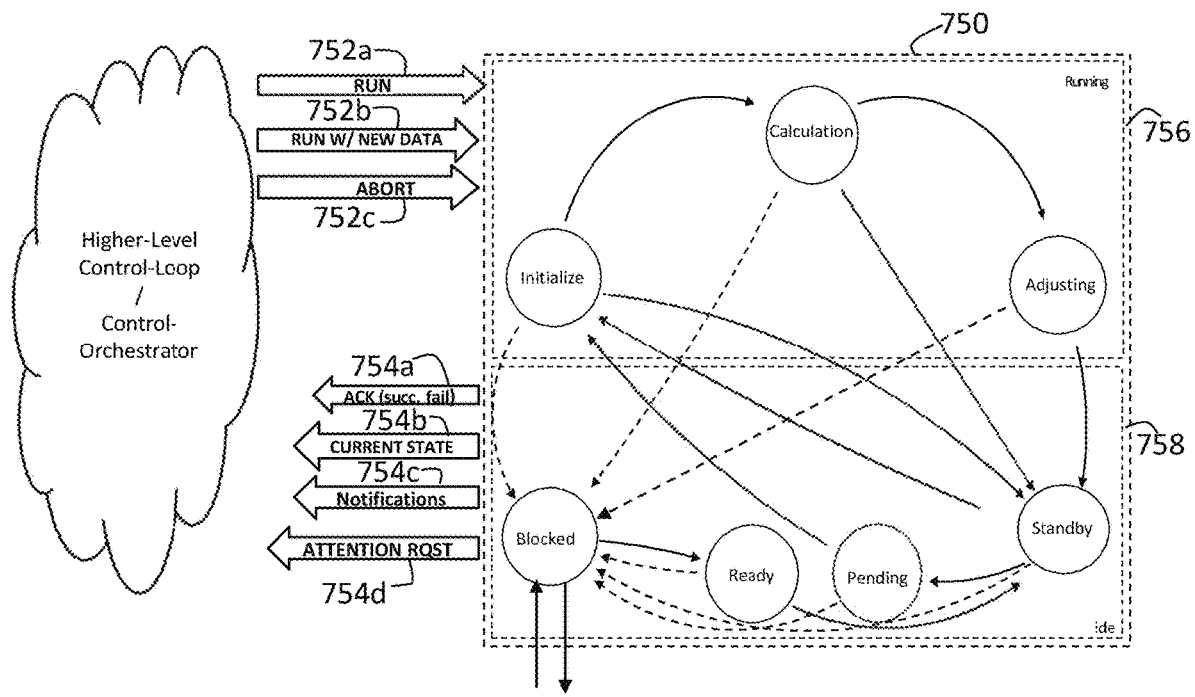
FIG. 21 is a block diagram illustrating an exemplary control loop state machine in accordance with the present disclosure.

FIG. 21 illustrates a block diagram of an exemplary control loop state machine 750 in accordance with the present disclosure. Each target point in an optical network has a control loop. Each control loop will be maintained and monitored by one control loop state machine 750 which will not run on the hardware itself. Instead, the control loop state machine 750 will run in a higher, abstracted layer. For instance, the control loop for SRG A/D node 520 in FIG. 16 would run in RNC 512.

The target point to which the control loop state machine 750 is assigned is called the device under control (DUC). DUC set values are defined consistently in sign in terms of gain/attenuation (i.e., negative if device is providing attenuation and positive if device is providing gain). DUCs are provided with monitoring tools (PM) such as a photo-diode and/or OCM which monitor power at input, output, or both. Monitoring tools might be PD (full band) or OPM (full band or per-sch). The DUC will have a corresponding band for controls.

All available monitoring tools will be monitored for stability by comparing target power vs. current values. If a DUC is found to be unstable, e.g., the current power and the target power show a convergence, the corresponding control loop will request a run.

For the sake of illustration, the control loop state machine 750 will be described herein as monitoring and controlling a WSS. However, it should be noted that certain internal actions within the states described might be different depending on the loop type and control mode. Therefore, the actions and/or power levels described are provided for illustration purposes only and should not be considered as limiting.

The control loop state machine 750 is provided with a running super state 756 and an idle super state 758. By default, i.e. once a connection has been created but control mode is off, the control loop state machine 750 will be operating in idle super state 758 and set to a BLOCKED state. When an UNBLOCK command is received, the control loop state machine 750 moves to a READY state. When the control loop state machine 750 receives the command to enable the control loop, the control loop state machine 750 moves to the STANDBY state. In the STANDBY state, the control loop state machine 750 continuously monitors the input/output monitoring tools and target vs. current values. If a deviation is found, the control loop state machine 750 sends an ATTENTION RQST indicating the control loop needs attention. After sending the ATTENTION RQST, the control loop state machine 750 moves to a PENDING state waiting for instructions.

When the control loop state machine 750 receives a RUN or a RUN with NEW DATA command, the control loop state machine 750 moves to the INITIALIZE state in the running super state 756. In the INITIALIZE state, the control loop state machine 750 verifies the target device is reachable, verifies OLOS at the input monitoring tool is cleared (if service is already up), verifies the input parameters for the Control Loop is refreshed after the previous control loop, and runs an instability check on monitoring tools based on historic samples (again, not that there might be different requirements for TLC loops and other loops). If PROVISION and RUN is received, the control loop state machine 750 configures the target device.

If the control loop state machine 750 receives an ABORT command, the initialization fails, or a predetermined time is reached before initialization is complete, the control loop state machine 750 returns to the STANDBY state.

Upon completion of initialization, the control loop state machine 750 moves to the CALCULATION state were the control loop state machine 750 runs calculations based on control loop type.

If the calculations take too long, i.e., a predetermined time is reached before the calculations are completed, the control loop state machine 750 moves to the STANDBY state and begins monitoring again. Further, if the calculations are run and the control loop state machine 750 determines that no adjustments are needed, the control loop state machine 750 moves to the STANDBY state and begins monitoring again.

If the control loop state machine 750 determines that adjustments are needed, the control loop state machine 750 moves to the ADJUSTING state and runs a pre-check to determine if the control loop is stable. If the control loop is stable, the control loop state machine 750 starts adjusting the DUC set point, following any ramping if needed.

Once adjustments are completed, an ABORT command is received, the adjustment reaches a predetermined time before completing the adjustment, upon full converge, or upon partial converge/clamping, the control loop state machine 750 moves to the STANDBY state.

It should be noted that in some embodiments the states, commands, and messages are the same across all types of control loops making any control loop able to interact with any other control loop.

Figure 22:
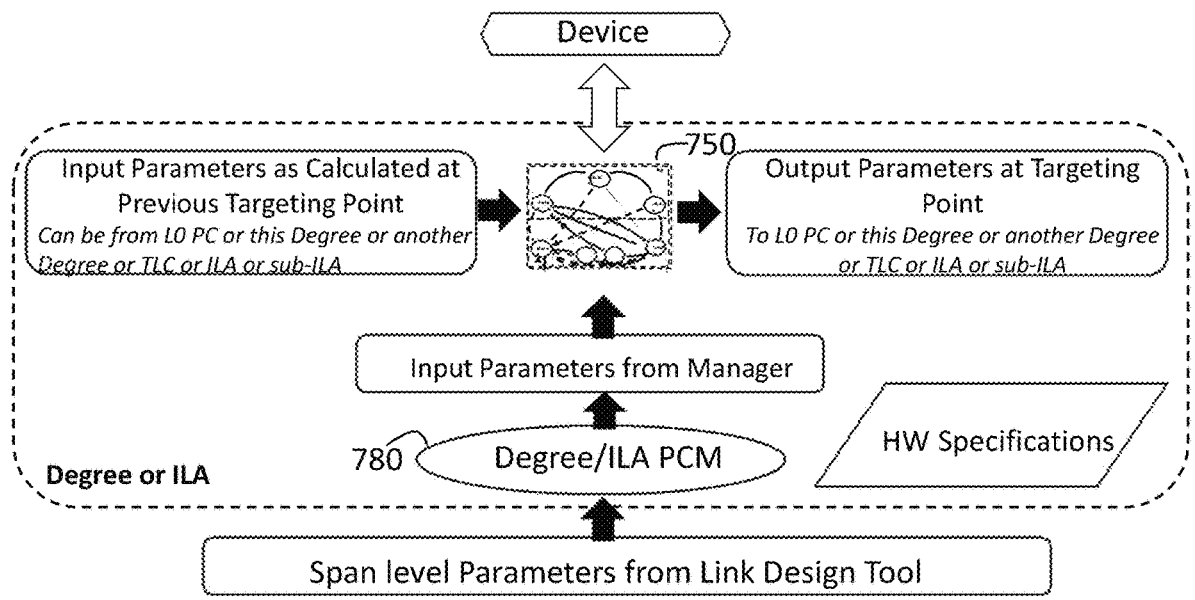
FIG. 22 is an illustration of an exemplary parameter flow in accordance with the present disclosure.

Referring now to FIGS. 21 and 22, the control loop state machine 750 intakes a set of input parameters, runs internal actions depending on the type of control loop and/or control mode, and outputs a set of parameters. Input parameters may be input parameters from manager (which come from a power control manager 780) or input parameters as calculated at previous target point (which may be L0 power controller, the same degree, another degree, TLC, ILA, or sub-ILA). For example, input parameters as calculated at previous target point may be communicated from a state machine associated with another degree node which communicates the calculated input parameters to the control loop state machine 750.

Output parameters may be communicated to L0 power controller, the same degree, another degree, TLC, ILA, or sub-ILA. For example, the output parameters may be communicated to a lower level control loop, the next target point, or a power controller (e.g., L0 power controller or SDN network controller).

In some embodiments, all control loops take the same set of power control parameters as input and they provide the same set of parameters as output. This standard interface allows any control loop to interface with any other control loop or power controller. Example input parameters (elements 752a-752c) and output parameters (elements 754a-754d) can be seen in FIG. 21.

Examples of different types of control loops include:

Open Loop (ILA EDFAs, FRM Demux Control Loop (DMCL) in which DUC set point (new)=output target (CALC)−input PM Closed loop (FRM Mux Control Loop (MCL) calculations) in which DUC set point (new)=DUC set point (current)+(output target−output PM)

Closed Loop on DUC set Point (Fixed Attenuation on Line Out VOA) in which DUC Set Point (New)=DUC Set Point (Current)+(DUC Set Point (Target)−(Output PM−Input PM))

Figure 23:
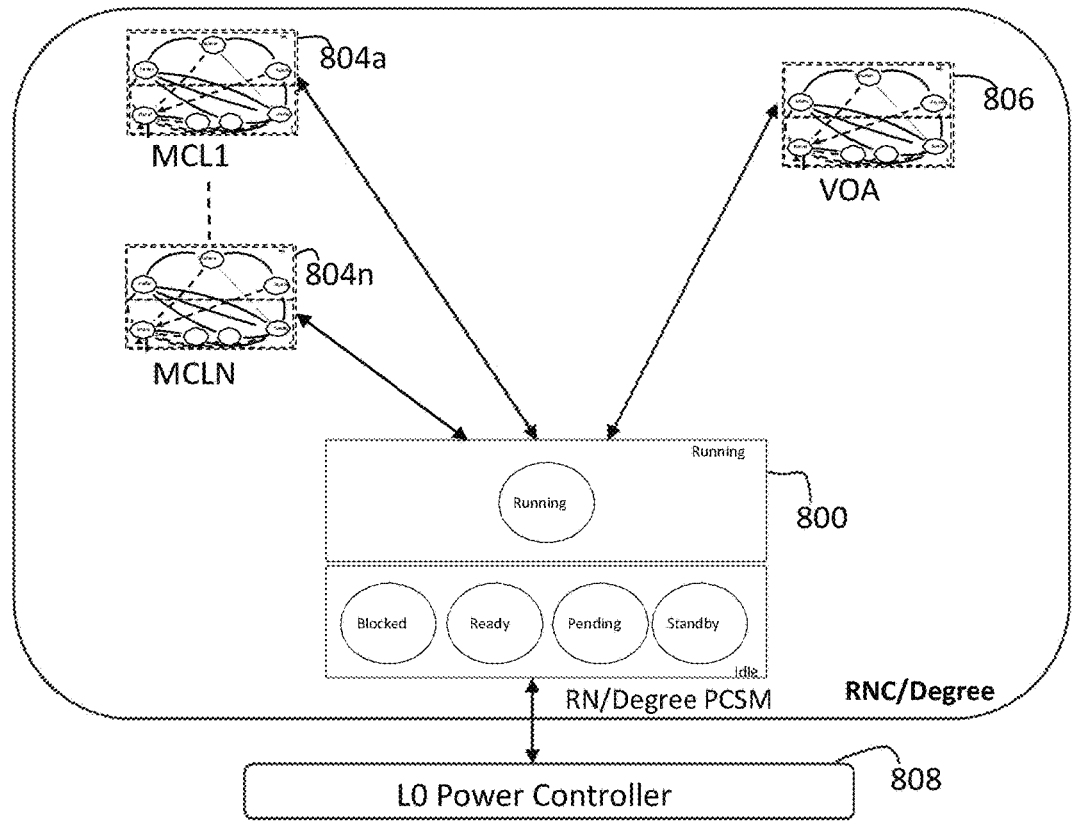
FIG. 23 is an illustration of an exemplary ROADM node controller power control state machine in accordance with the present disclosure.

FIG. 23 illustrates an exemplary ROADM node controller power control state machine (RNC PCSM) 800. RNC PCSM 800 is a super-state machine and acts as the local orchestrator and message handler within an RNC 802. Control loops run within the RNC PCSM 800 may be run in series or in parallel. For instance, the mux control loops (MCL) 804a-804n are shown being executed in parallel.

In an exemplary flow, upon detection of a deviation in MCL 804a, for instance, MCL 804a will ask for attention from RNC PCSM 800. RNC PCSM 800 will then ask for attention from L0 power controller 808. L0 power controller 808 orchestrates control loop execution in the network. Hence, when it is the RNC's 802 turn, L0 power controller 808 will send a RUN command to RNC PCSM 800. Then RNC PCSM 800 will send a RUN command to MCL 804a internally.

Figure 24:
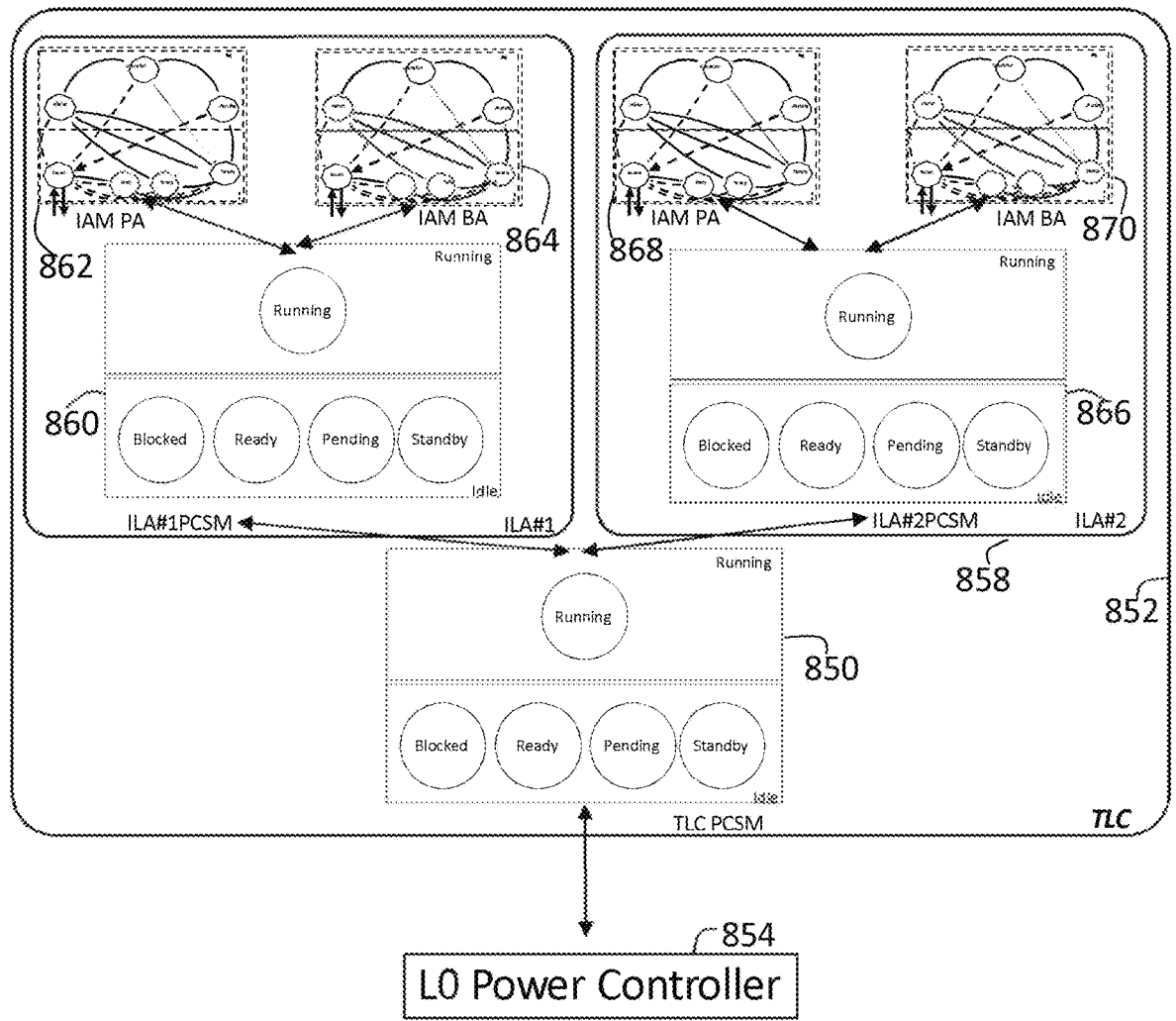
FIG. 24 is an illustration of an exemplary transport line controller power control state machine in accordance with the present disclosure.

FIG. 24 illustrates an exemplary transmission line controller power control state machine (TLC PCSM) 850 running in a transmission line controller (TLC) 852. The TLC PCSM 850 interfaces with L0 power controller 854 and acts as the local orchestrator and message handler in the TLC 852.

In the illustrated example, TLC 852 is connected to a first ILA (not shown) and a second ILA (not shown). For the sake of illustration, the first ILA and the second ILA each are provided with a pre-amp (PA) and a booster amp (BA).

TLC PCSM 850 has a first super-state 856 and a second super-state 858. The first super-state 856 is provided with a first ILA PCSM 860, a first ILA PA control loop 862, and a first ILA BA control loop 864.

The second super-state 858 is provided with a second ILA PCSM 866, a second ILA PA control loop 868, and a second ILA BA control loop 870.

A state of the first super-state 856 and the second super-state 866 indicate a status of aggregate states of the underlying control loops of the first ILA and the second ILA, respectively. The state of the TLC PCSM 850 indicate a status of aggregate states of the underlying PCSM states (the first super-state 856 and the second super-state 866). Hence, each level is abstracted by a layer higher above, which interfaces with a higher level controller. This higher level controller can be another layer of abstraction or the L0 power controller 854.

The TLC PCSM 850, first super-state 856, second super-state 858, first ILA PCSM 860, first ILA PA control loop 862, first ILA BA control loop 864, second ILA PCSM 866, second ILA PA control loop 868, and second ILA BA control loop 870 communicate through internal data.

Figure 25:
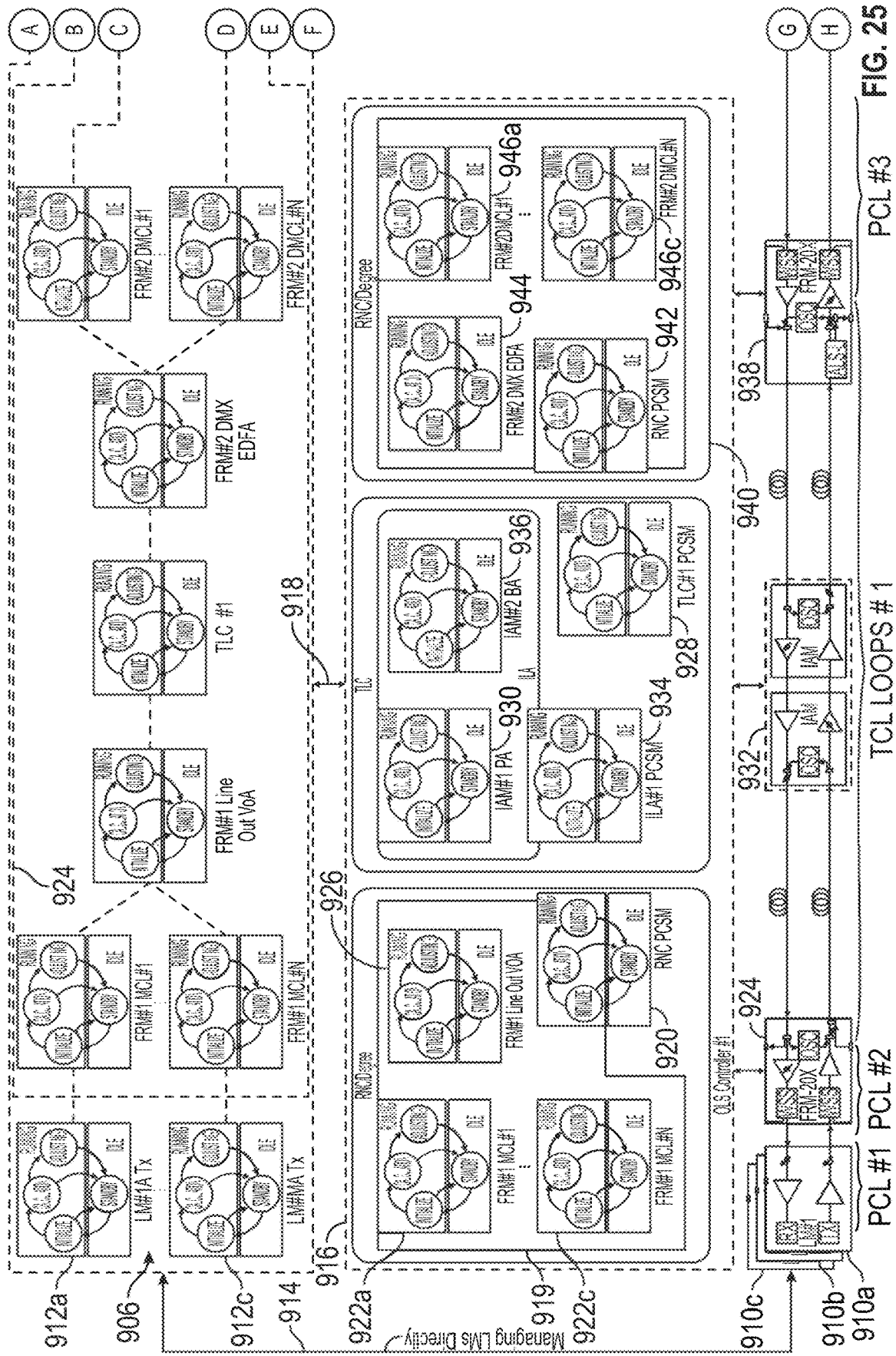
FIG. 25 is a block diagram illustrating an exemplary L0 power controller orchestrating a sequence of control loops in accordance with the present disclosure.

FIG. 25 is a block diagram illustrating an example SDN architecture 900 and ROADM optical network 902. The optical power flow through nodes, amplifiers, and optical fibers of the ROADM optical network 902 create a sequential downstream dependency, i.e., a change made/observed at a target point (e.g. node or amplifier) will also be observed on all downstream target points. Hence, the dependency is traced and the control loops that affect the input and output powers of other control loops are handled depending upon the dependency. L0 power controller 904 keeps a graphical map 906 of the ROADM optical network 902 and actively tracks the source and destination of each optical channel along with the optical path (nodes) traversed by the optical channel. This is called a dependency matrix for the ROADM optical network 902. This allows L0 power controller to monitor and control an overall state of each control loop.

A hierarchy of control loops is determined based on the dependency matrix. This hierarchy determines the sequence of execution of control loops following the optical signal flow. In certain cases, the hierarchy of control loops includes grouped or nested control loops that may be run in parallel because they do not have direct dependence. For instance, in the exemplary ROADM optical network 902 illustrated in FIG. 25, each optical channel 910a-910c may be controlled independently and in parallel in first power control loops 912a-912c because none of the optical channels 910a-910c directly depend from each other. First control loops 912a-912c are maintained and controlled by the L0 power controller 904 through communication link 914.

L0 power controller 904 communicates with a first OLS controller 916 through the communication link 918. Once all three first control loops 912a-912c have completed, L0 power controller 904 will send a run command to a RNC PCSM 920 running in a first RNC 919. The RNC PCSM 920 is a super-state machine and acts as the local orchestrator and message handler within an RNC 919. After receiving the RUN command, RNC PCSM 920 sends a RUN command to second power control loops 922a-922c to begin. Each optical channel 910a-910c may be controlled independently and in parallel in second power control loops 922a-922c because the optical channels 910a-910c are individually controlled by a wavelength selective switch (WSS) upon entering a first ROADM node 924.

RNC PCSM 920 executes each of the second power control loops 922a-922c in parallel then aggregates the status of each of the second power control loops 922a-922c into a single state and sends the single state to the L0 power controller 904. L0 power controller 904 maintains a super-state image of the status of all control loops which the L0 power controller 904 does not maintain (indicated by node 924). This way. L0 power controller 904 maintains awareness of the status of all elements in the ROADM optical network 902.

Once second power control 922a-922c have completed, the RNC PCSM 920 sends a run command to a third power control loop 926. Optical channels 910a-910c were multiplexed in the WSS of the first ROADM node 924, consequently, a dependency (coupling) between optical channels 910a-910c was created. As a result, the optical channels 910a-910c are processed in series until the optical channels 910a-910c are demultiplexed.

Once the third power control loop 926 has completed. RNC PCSM 920 sends the status of the third power control loop 926 to the L0 power controller 904.

The L0 power controller 904 then sends a RUN command to a TLC PCSM 928 to run the next control loops. TLC PCSM 928 communicates a RUN command to ILA PCSM 934 which executes a fourth power control loop 930. Once fourth power control loop 930 has completed, ILA PCSM 934 sends a RUN command to a fifth power control loop 936. Once the fifth power control loop 936 has completed, ILA PCSM 934 sends an aggregated status of the fourth and fifth power control loops 934 and 936 to TLC PCSM 928 which communicates the aggregated status to the L0 power controller 904.

The optical signal then passes into a second ROADM node 938 monitored by a second RNC 940. After receiving the aggregated status from TLC PCSM 928, L0 power controller 904 sends a RUN command to a second RNC PCSM 942 running on the second RNC 940. The second RNC PCSM 942 sends a RUN command to a sixth power control loop 944.

Once the sixth power control loop 944 has completed, the second RNC PCSM 942 sends a RUN command to seventh power control loops 946a-946c. Seventh power control loops 946a-946c can be run in parallel because the optical channels 910a-910c were demultiplexed in the second ROADM node 938.

The output of the seventh power control loops 946a-946c are provided to a RNC PCSM 956 of a third RNC 958 running in a second OLS controller 960. The second OLS controller 960 operates in a similar manner to the first OLS controller 916. Such operation will not be described herein in detail in the interest of brevity.

Under normal conditions, the L0 power controller 904 will only grant permission for one control loop (or a parallel group of control loops) to run at a time. The L0 power controller 904 then waits a predefined period of time for the control loop to complete the action before allowing another control loop to begin. However, it should be noted that a power controller can abort any running control loop by sending an ABORT request. For instance, if a PCSM in an upstream span sends a request for attention, the power controller can send an ABORT request to the currently running control loop. The currently running control loop is gracefully stopped and notification is sent to the higher level controller. After receiving the notification, the higher level controller can send a signal to the PCSM that requested attention to RUN a control loop to evaluate the problem.

CONCLUSION

Currently, optical transport systems use serial mechanisms for path recovery; however, these serial mechanisms are time consuming to restore the optical path. In accordance with the present disclosure, methods and apparatus are described for providing a SDN L0 network controller 24 monitoring all of the optical nodes 22 and activating a restore path in a parallel manner, thereby reducing the time for restoring connectivity once a fault has been detected in a working connection.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method comprising the steps of:
receiving, by circuitry of a software defined network L0 network controller, first network performance information of a transport network having a first path through the transport network including a first ROADM node, a second ROADM node and an optical transmission line establishing optical communication between a first degree of the first ROADM node and a second degree of the second ROADM node, the optical transmission line including an in-line amplifier node having a total input power and a total output power, the in-line amplifier node having a first monitoring tool configured to measure input optical power of the in-line amplifier node, and a second monitoring tool configured to measure output optical power of the in-line amplifier node;
streaming the input optical power and the output optical power measured by the first and second monitoring tools, respectively, from the in-line amplifier node to the software defined network L0 controller; and
configuring, by the software defined network L0 network controller, at least one of a gain and a gain tilt of the in-line amplifier node,
wherein the step of streaming the measured input optical power and the measured output optical power by the first and second monitoring tools, respectively, includes indirectly streaming to the software defined network L0 power controller by streaming the measured input optical power and the measured output optical power to the first ROADM node.

2. The method of claim 1, wherein the in-line amplifier node is a first in-line amplifier node, and wherein the optical transmission line includes a second in-line amplifier node located in a series configuration with the first in-line amplifier node, the second in-line amplifier node having a third monitoring tool configured to measure input optical power of the second in-line amplifier node, and a fourth monitoring tool configured to measure output optical power of the second in-line amplifier node, and further comprising the step of streaming optical power measured by the third and fourth monitoring tools to the software defined network L0 power controller.

3. The method of claim 1, wherein the software defined network L0 network controller is programmed with a first control loop monitoring the optical power measured by the first monitoring tool, and a second control loop monitoring the optical power measured by the second monitoring tool.

4. The method of claim 3, wherein the first control loop and the second control loop are heirarchial related within the software defined network L0 network controller based upon a dependency matrix, the hierarchy determining the sequence of execution of the first control loop and the second control loop.

5. The method of claim 3, wherein the first control loop and the second control loop are run in parallel due to a lack of direct dependency between the first control loop and the second control loop.

6. A method comprising the steps of:
receiving, by circuitry of a software defined network L0 network controller, first network performance information of a transport network having a first path through the transport network including a first ROADM node, and a second ROADM node and an optical transmission line establishing optical communication between a first amplifier of a first degree of the first ROADM node and a second degree of the second ROADM node, the first ROADM node having a monitoring tool configured to measure channel power transmitted through the first degree of the first ROADM node;
streaming, with a streaming service based on IP over Ethernet over an optical supervisory channel, the channel power measured by the monitoring tool to the software defined network L0 controller; and
configuring, by the software defined network L0 network controller, a gain of the first amplifier.

7. The method of claim 6, wherein the monitoring tool measures channel power for each channel transmitted through the first degree of the first ROADM node.

8. The method of claim 6, wherein the monitoring tool is a first monitoring tool, and wherein the second ROADM node has a second monitoring tool configured to measure channel power transmitted through the second degree of the second ROADM node, and further comprising the steps of streaming the channel power transmitted through the second degree of the second ROADM node to the software defined network L0 network controller, and configuring, by the software defined network L0 network controller, a gain of a second amplifier within the second ROADM node.

9. The method of claim 6, wherein the monitoring tool is a first monitoring tool, and wherein the second ROADM node has a second monitoring tool configured to measure channel power transmitted through the second degree of the second ROADM node, and wherein the software defined network L0 network controller is programmed with a first control loop monitoring the optical power measured by the first monitoring tool, and a second control loop monitoring the optical power measured by the second monitoring tool.

10. The method of claim 9, wherein the first control loop and the second control loop are heirarchial related within the software defined network L0 network controller based upon a dependency matrix, the hierarchy determining the sequence of execution of the first control loop and the second control loop.

11. The method of claim 9, wherein the first control loop and the second control loop are run in parallel due to a lack of direct dependency between the first control loop and the second control loop.

12. An optical network, comprising:
a first ROADM node having a first degree;
a second ROADM node having a second degree;
an optical transmission line establishing optical communication between the first degree of the first ROADM node and the second degree of the second ROADM node, the optical transmission line including an in-line amplifier node having a total input power and a total output power, the in-line amplifier node having a first monitoring tool configured to measure input optical power of the in-line amplifier node, and a second monitoring tool configured to measure output optical power of the in-line amplifier node; and
a software defined network L0 network controller having circuitry configured to receive, via a streaming service based on IP over Ethernet over an optical supervisory channel, the optical power measured by the first and second monitoring tools from the in-line amplifier node, and to configure at least one of a gain and a gain tilt of the in-line amplifier node.

13. The optical network of claim 12, wherein the in-line amplifier node is a first in-line amplifier node, and wherein the optical transmission line includes a second in-line amplifier node located in a series configuration with the first in-line amplifier node, the second in-line amplifier node having a third monitoring tool configured to measure input optical power of the second in-line amplifier node, and a fourth monitoring tool configured to measure output optical power of the second in-line amplifier node, and wherein the software defined network L0 network controller receives optical power measured by the third and fourth monitoring tools.

14. The optical network of claim 12, wherein the software defined network L0 network controller is programmed with a first control loop monitoring the optical power measured by the first monitoring tool, and a second control loop monitoring the optical power measured by the second monitoring tool.

15. The method of claim 14, wherein the first control loop and the second control loop are heirarchial related within the software defined network L0 network controller based upon a dependency matrix, the hierarchy determining the sequence of execution of the first control loop and the second control loop.

16. The method of claim 14, wherein the first control loop and the second control loop are run in parallel due to a lack of direct dependency between the first control loop and the second control loop.

* * * * *